United States Patent
Elhard et al.

(10) Patent No.: US 11,359,475 B2
(45) Date of Patent: Jun. 14, 2022

(54) MULTI-COMPONENT SOLID EPOXY PROPPANT BINDER RESINS

(71) Applicant: Battelle Memorial Institute, Columbus, OH (US)

(72) Inventors: Joel D. Elhard, Hilliard, OH (US); Phillip N. Denen, Reynoldsburg, OH (US); Robert S. Whitmore, Lexington, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 16/934,964

(22) Filed: Jul. 21, 2020

(65) Prior Publication Data

US 2021/0040833 A1 Feb. 11, 2021

Related U.S. Application Data

(62) Division of application No. 15/672,398, filed on Aug. 9, 2017, now Pat. No. 10,738,583.

(60) Provisional application No. 62/377,670, filed on Aug. 21, 2016.

(51) Int. Cl.

| | | |
|---|---|---|
| *E21B 43/267* | (2006.01) | |
| *C08L 63/00* | (2006.01) | |
| *C09K 8/575* | (2006.01) | |
| *C09K 8/80* | (2006.01) | |
| *C09D 163/00* | (2006.01) | |
| *C08G 59/44* | (2006.01) | |
| *C08G 59/42* | (2006.01) | |
| *C08G 59/62* | (2006.01) | |
| *C08G 59/66* | (2006.01) | |
| *C08G 59/50* | (2006.01) | |
| *C09K 8/68* | (2006.01) | |

(52) U.S. Cl.
CPC ............ *E21B 43/267* (2013.01); *C08G 59/42* (2013.01); *C08G 59/44* (2013.01); *C08G 59/50* (2013.01); *C08G 59/5073* (2013.01); *C08G 59/62* (2013.01); *C08G 59/66* (2013.01); *C08L 63/00* (2013.01); *C09D 163/00* (2013.01); *C09K 8/5755* (2013.01); *C09K 8/5756* (2013.01); *C09K 8/685* (2013.01); *C09K 8/805* (2013.01)

(58) Field of Classification Search
CPC .................................................... E21B 43/267
See application file for complete search history.

(56) References Cited

U.S. PATENT DOCUMENTS

| | | |
|---|---|---|
| 3,929,191 A | 12/1975 | Graham et al. |
| 4,767,832 A | 8/1988 | Marx |
| 4,869,960 A | 9/1989 | Gibb et al. |
| 4,888,240 A | 12/1989 | Graham et al. |
| 5,218,038 A | 6/1993 | Johnson et al. |
| 5,422,183 A | 6/1995 | Sinclair et al. |

(Continued)

*Primary Examiner* — Angela M DiTrani Leff
*Assistant Examiner* — Avi T Skaist
(74) *Attorney, Agent, or Firm* — Susanne A. Wilson; Frank Rosenberg

(57) ABSTRACT

Methods and materials for sand control in water injection sites are disclosed. Proppant particles may be coated with some particles coated with a solid epoxy and other proppant particles coated with a solid epoxy curative (such as amine, hydroxyl, carboxyl, anhydride) that would bind the particles through an epoxy reaction. The invention may be advantageous for forming underground structures useful in the extraction of hydrocarbons.

11 Claims, 14 Drawing Sheets

(56) References Cited

U.S. PATENT DOCUMENTS

| | | |
|---|---|---|
| 6,107,437 A | 8/2000 | Cawse et al. |
| 6,997,259 B2 | 2/2006 | Nguyen |
| 7,021,379 B2 | 4/2006 | Nguyen |
| 7,135,231 B1 | 11/2006 | Sinclair et al. |
| 7,153,575 B2 | 12/2006 | Anderson et al. |
| 7,267,171 B2 | 9/2007 | Dusterhoft et al. |
| 7,334,635 B2 | 2/2008 | Nguyen |
| 7,407,010 B2 | 8/2008 | Rickman et al. |
| 7,448,451 B2 | 11/2008 | Nguyen |
| 7,624,802 B2 | 12/2009 | McCrary et al. |
| 7,673,686 B2 | 3/2010 | Nguyen et al. |
| 8,127,850 B2 | 3/2012 | Brannon et al. |
| 8,240,383 B2 | 8/2012 | Xu et al. |
| 8,273,426 B1 | 9/2012 | Laramay et al. |
| 8,333,241 B2 | 12/2012 | Dusterhoft et al. |
| 8,770,294 B2 | 7/2014 | Tanguay et al. |
| 8,875,786 B2 | 11/2014 | Nguyen et al. |
| 8,936,087 B2 | 1/2015 | Nguyen et al. |
| 9,206,349 B2 | 12/2015 | Turakhia et al. |
| 9,260,650 B2 | 2/2016 | Nguyen et al. |
| 2008/0006405 A1 | 1/2008 | Rickman et al. |
| 2008/0230223 A1* | 9/2008 | McCrary ............... C09D 7/62 166/272.2 |
| 2010/0326660 A1 | 12/2010 | Ballard et al. |
| 2016/0177693 A1* | 6/2016 | Gomaa ............... E21B 43/26 166/250.07 |

* cited by examiner

Bisphenol A epoxy novolac

Tetraglycidyl ether of
tetrakis(4-hydroxyphenyl)ethane

Diglycidyl ether of tetramethyl biphenol

Diglycidyl ether of 1,5-dihydroxy naphthalene

Tetraglycidyl ether based on dihydroxy naphthalene

Triglycidyl isocyanurate

Battelle Epon 154 Epoxy-functional Novolak Resin
Component A (n=3.6)

Battelle Epon 164 Epoxy-functional Cresol Resin
Component A (n=4.1)

MULTI-COMPONENT SOLID EPOXY PROPPANT BINDER RESINS

RELATED APPLICATION

This application is a divisional of U.S. patent application Ser. No. 15/672,398 filed Aug. 9, 2017, now U.S. Pat. No. 10,738,583 and claims priority to U.S. provisional patent application Ser. No. 62/377,670, filed 21 Aug. 2016.

INTRODUCTION

The extraction of hydrocarbons from underground formations has great economic importance. As a result, extensive research has been devoted toward developing and improving techniques for extracting hydrocarbons. The inventions described in this disclosure provide improvements in the extraction of hydrocarbons that use water injection wells, especially the extraction of hydrocarbons from sub-sea level formations. They may also be used in any unconsolidated formation where sand control methods (such as Frac-packing) are needed to prevent passage of formation sand or produced sand and clay into the production zone where they can clog screens and reduce productivity.

Frac-packing (or Frac-n-Pak, or FnP) involves the simultaneous hydraulic fracturing of a reservoir and the placement of a gravel pack. The fracture is created using a high-viscosity fluid, which is pumped at above the fracturing pressure. Screens are in place at the time of pumping. The sand control gravel is placed outside the casing/screen annulus. The aim is to achieve a high-conductivity gravel pack, which is at a sufficient distance from the wellbore, and so create a conduit for the flow of reservoir fluids at lower pressures. The frac-pack technique combines the production improvement from hydraulic fracturing with the sand control provided by gravel packing.[1]

[1] Middle East & Asia Reservior Review Number 8, 2007, p. 41

In sub-sea level formations with high permeability, a production well can be surrounded with one or more injection wells. Water is injected into the injection well(s) to maintain pressure in the reservoir rock as well as to sweep the hydrocarbons to the production well(s).

FIG. 1 illustrates the injection well with proppant placement. At a suitable depth in the well, the well casing is perforated, then plumbing is installed to deliver proppant and subsequently inject water into the well. After placing a screen, a fractured zone is hydraulically created in the formation, then proppant material is pumped as a slurry to hold open the fracture after the proppant becomes immobile. The void between the casing ID and the screen is filled to maintain a path for fluid flow into the well. The proppant holds the formation open to maintain a fluid path for injected seawater to pass down while preventing formation material from entering the well bore by acting as a filter.

Much of the expense with water injection in sandy formations is involved with the logistics of timing of the Frac and Pack (FnP) sand control operations. Once the FnP filter-pack is injected, the rig must be dismantled, equipment must be removed from the well-bore and transported to the next water injection well, which can up to a week. Any sand control treatment that reacts and cures too rapidly at the down-hole temperatures of e.g. 160-200° F., can fuse well equipment in-place like cement. Therefore, an ideal sand-control system should have a latent cure or a controlled delay before curing begins which can be tuned to the down-hole temperature conditions. For example, develop minimal unconfined compressive strength (UCS) of <50 psi for 3-5 days so that rig equipment can be withdrawn easily and transported to the neighboring site.

Most conventional resin coated proppants (RCP) are coated with high temperature Phenol-formaldehyde Novolak resins which have been pre-reacted to a very high melt viscosity which can react with similar B-stage material on adjacent particles. However, it has been found that an external stress of ~2000 psi must be placed on the particle mass to get adequate bonding between particles. In the absence of this stress the hard particles do not bond, and are not useful in sand consolidation operations where lower stress is available. Ideally, RCP for sand control operations for water injection wells, must also be able to cure under only atmospheric pressure range (~1 G).

Current systems can be flushed out of the annulus and lost into the reservoir via the fracture as particles are carried away by high rate water injection. This means the system can no longer prevent formation material from entering the wellbore. Therefore, it is desirable to find solutions that prevent the proppant from being flushed away.

The invention described in this patent involves resin coated proppants. Generally, resin coated proppants (RCP) are either precured or curable. Precured resin coated proppants comprise a proppant coated with a resin that has been significantly crosslinked. This precured resin coating provides crush resistance to the proppant. The resin coating is already cured before it is introduced into the well and therefore, the proppant does not agglomerate. However, in some instances, precured proppants may flow back from a propped fracture, especially during clean up or production in oil and gas wells, because they are mainly held in the fracture by stress. In contrast, curable resin coated proppants comprise a proppant coated with a resin which has not been significantly crosslinked before being placed in a subterranean formation. Curable resins include (i) resins which are cured entirely in the subterranean formation and (ii) resins which are partially cured prior to injection into the subterranean formation with the remainder of curing occurring in the subterranean formation. Curing occurs as a result of the crosslinking of the resin, which may occur as a result of the stress and temperature conditions existing in the subterranean formation, and/or as a result of an activator and/or catalyst. The object is to cause the proppant to bond together and form a 3-dimensional matrix and thereby prevent proppant flow-back. Most RCP are coated with high temperature Phenol-formaldehyde Novolak resins which have been pre-reacted to a very high melt viscosity but have residual functionality which can react with similar B-stage material on adjacent particles. However, it has been found that an external stress of ~1000-2000 psi must be placed on the particle mass to get adequate bonding between particles. In the absence of this stress the hard particles do not bond, and are not useful in sand consolidation operations where lower stress is available. This is illustrated in Table 1 from published data. In U.S. Pat. No. 5,218,038, the inventors stated that "relative low strength [is] obtained in the cured composition if cured without compression, but high compressive strengths if cured under pressure. This is important and valuable if the resin coating should accidentally be cured in the pipe or well hole before it reaches the subterranean formation where high pressures and temperatures are encountered. Prematurely cured compositions produced by the present invention can be flushed out of the pipe with water whereas conventional hexamethylenetetramine-cured novolaks cannot be flushed with water from the pipe or well hole."

[2]TABLE 1

Unconfined Compressive Strength of Curable Resin Coated
Proppant with and without 1000 psi closure stress 2

| | API Mesh Size | | | |
|---|---|---|---|---|
| | 16/30 | 20/40 | 30/50 | 40/70 |
| Bulk Density (lb/cu. ft) | 94.3 | 94.9 | 94.9 | 93.01 |
| Specific Gravity | 2.56 | 2.55 | 2.55 | 2.5 |
| Unconfined Compressive Strength: | | | | |
| 228° F. and 1,000 psi closure (24 hours) | >600 psi | >600 psi | >650 psi | >660 psi |
| 228° F. and 0 psi closure (24 hours) | <5 psi | <5 psi | <5 psi | <5 psi |

[2]Atlas Curable Resin Coated Propant (CRC-C) Technical Datasheet, Atlas Resin Coated Proppant LLC, Taylor Wisconsin.

Contrary to prior art efforts such as that described in the above table and in U.S. Pat. No. 5,218,038, we have sought, RCP for sand control operations for water injection wells that can able to cure under only atmospheric pressure range (~1 G) and have a latent cure to prevent premature curing in the wellbore.

Some prior art references describe the use of "tackifying agents" or tackifiers blended with particulates on the fly (e.g Nguyen et al U.S. Pat. Nos. 8,875,786, 8,936,087). As used herein "tackifying agent" refers to a non-hardening substance that has a nature such that it is (or may be activated to become) somewhat sticky to the touch. The term "tackifying agent" is not meant to encompass resin material that cures to form a hard substance. Tackifiers must remain sticky because their function is to trap fine particles that may be floating by or are generated by the crushing of an uncoated proppant particle. In the present invention, cured binder resin coated proppants (RCP) are used to eliminate the need for tackifying agents, since even if the RCP particle is compressed, it is not friable and will self-contain any fractured regions.

Since the present invention involves the use of epoxy resin binders, a brief summary of some prior patents involving binder reactions are discussed here. Ballard et al. in US20100326660 entitled Use Of Direct Epoxy Emulsions For Wellbore Stabilization describe using an epoxy resin emulsion that is delivered downhole. The emulsion comprises an oil-miscible epoxy-based resin and an oil-immiscible hardening agent that are reacted in the wellbore.

Nguyen et al. in U.S. Published Patent Application 2014/0060828 entitled Methods for Hindering Settling of Proppant Aggregates in Subterranean Operations described a method of fracturing a subterranean formation by providing proppant aggregates themselves comprising proppant particles coated with a binding fluid and having foamed particulates adhered thereto; and placing the proppant aggregates suspended in gelled treatment fluid into at least a portion of the fracture so as to form a proppant pack therein. Nguyen et al. mention a lengthy list of optional resins.

McCrary et al. in US2008/0230223 describe a substantially homogeneous particle comprising a partly cured binder and filler particles, or a hybrid particle comprising an inorganic core where the coating has a continuous phase of resole resin with reactive powder particles embedded in the continuous phase. The particles suspended in a carrier fluid can be injected into a subterranean formation.

One of the distinguishing characteristics of the materials of this invention is that once introduced down-hole in a high viscosity gel, they can cure in-place without the requirement to completely flush or "break" the gel surrounding them.

This is in contrast to the prior art such as described in Johnson et. al U.S. Pat. No. 5,218,038 incorporated herein for reference: "Furthermore, if the fracturing fluid gel does not break and allow the curable resin-coated proppants to come together before the resin cures, they cannot bond together forming a three dimensional matrix. If they do not bond together, flowback may occur." [col. 1 line 35-44] In addition, the reference describes the conventional rationale for requiring high compressive stress on curable RCP to initiate cure: "It is desirable that a proppant has low compressive strength at atmospheric pressure and possesses high compressive strength under load . . . " (typically ~1000 psi). "If a proppant is not correctly placed in well fractures and experiences no stress during cure, the improperly placed proppant of the present invention can be removed easily. [col. 11 line 64-68, col. 12 line 1]. By contrast, the present invention requires no external stress to cure and yet can be removed easily from well components using the latent cure imparted by the technology.

SUMMARY OF THE INVENTION

In a first aspect, the invention provides a method of binding proppants in an underground formation, comprising: contacting a first resin coated proppant with a second resin coated proppant in an underground formation at a temperature sufficient to cause a resin coating on the first resin coated proppant to react with a resin coating on the second resin coated proppant in an epoxy reaction;

wherein a reactive component in the resin coating on the first coated proppant consists essentially of one or more epoxy moieties and wherein a reactive component in the resin coating on the second coated proppant consists essentially of one or more amine, amide, imidazole, hydroxyl, thiol, or carboxyl moieties or combinations thereof.

For the purposes of this invention, an "epoxy reaction" is defined as a reaction between an epoxy moiety on one resin with a second reactive component on a another resin where the second reactive component includes a moiety selected from an amine, amide, imidazole, hydroxyl, thiol, or carboxyl moiety.

In the context of this invention, that a coating "consists essentially of" means that it excludes other components that would substantially affect the performance of the coating. For example, a resin coating wherein a reactive component "consists essentially of" an epoxy means that the coating does not contain reactive curative since this would result in premature coupling of the components.

Another aspect of the invention provides a proppant network structure kit, comprising: a first container comprising a first resin coated proppant wherein a reactive component in the coating on the first resin coated proppant consists essentially of one or more epoxides; and a second container comprises a second resin coated proppant wherein a reactive component in the resin coating on the second resin coated proppant consists essentially of one or more amines, amides, imidazoles, thiols, hydroxyls, or carboxyls or combinations thereof.

In a further aspect, the invention provides a slurry, comprising: a first resin coated proppant, a second resin coated proppant, and a carrier fluid; wherein a reactive component in the resin coating on the first coated proppant consists essentially of one or more epoxy moieties and wherein a reactive component in the resin coating on the second coated proppant consists essentially of one or more amine, amide, imidazole, hydroxyl, thiol, or carboxyl moieties or combinations thereof.

In another aspect, the invention provides a method of extracting hydrocarbons from an underground formation, comprising: forming at least one production well; optionally, forming at least one water injection well in proximity to the at least one production well; injecting the slurry (described herein) through a wellbore and into the underground formation; wherein the proppants in the slurry react via an epoxy reaction to form a cross-linked, porous and immobilized proppant network in the area around the wellbore; injecting water into the underground formation; and withdrawing hydrocarbons through the production well. This method preferably includes forming at least one water injection well in proximity to the at least one production well; and passing water through the wellbore of the water injection well. In some embodiments, water is passed through the wellbore of the production well prior to the step of withdrawing hydrocarbons through the production well.

In a further aspect, the invention provides a resin coated proppant composition, comprising first resin coated proppant particles and second resin coated proppant particles; wherein a reactive component in the resin coating on the first coated proppant consists essentially of one or more epoxy moieties and wherein a reactive component in the resin coating on the second coated proppant consists essentially of one or more amine, amide, imidazole, hydroxyl, thiol, or carboxyl moieties or combinations thereof. In some preferred embodiments, the first and/or second resin coated proppant particles comprise a water-soluble release coating.

In another aspect, the invention provides a method of stabilizing soil formations, wherein proppants of various sizes are used in the inventive methods to adjust the drainage properties of the soil formation. This can be conducted on an unconsolidated, subsided or eroding formation in which the resulting network is stronger and denser than for water injection usage.

Various preferred embodiments of the invention possess one or any combination selected from the following: the temperature is at least 160° F., or from 160 to 250° F., or from 180 to 230° F., or from 190 to 220° F.; the temperature is naturally occurring temperature in the downhole environment (alternatively, the temperature could be modified to a desired temperature range for the epoxy reaction); the slurry comprises HEC gel but not crosslinked Guar gel; wherein, prior to delivering the slurry through a wellbore, the first and/or second and/or third resin coated proppant comprises a water-soluble release coating; wherein the ratio of the first coated proppant particles to the second coated proppant particles is from 10:1 to 1:10, more preferably in the range 2:1 to 1:2, and most preferably within 10% of a 1:1 ratio by number of particles of each (in some alternative embodiments, these ratios correspond to mass or volume in place of number); wherein the ratio of the second coated proppant particles to the third coated proppant particles is from 10:1 to 1:10, more preferably in the range 2:1 to 1:2, and most preferably within 10% of a 1:1 ratio by number of particles of each (in some embodiments, these ratios correspond to mass or volume in place of number) wherein, prior to delivery in a slurry, and not including any release coating (if present), the resin coating on the first resin coated particle has a thickness in the range of 10 μm to 200 μm, in some embodiments in the range of 20 μm to 150 μm, in some embodiments in the range of 50 μm to 120 μm; wherein, prior to delivery in a slurry, and not including any release coating (if present), the resin coating on the second resin coated particle has a thickness in the range of 10 μm to 200 μm, in some embodiments in the range of 20 μm to 150 μm, in some embodiments in the range of 50 μm to 120 μm; wherein, prior to delivery in a slurry, and not including any release coating (if present), the resin coating on the third resin coated particle has a thickness in the range of 10 μm to 200 μm, in some embodiments in the range of 20 μm to 150 μm, in some embodiments in the range of 50 μm to 120 μm; wherein, prior to delivery in a slurry, and not including any release coating (if present), or wherein the epoxy comprise a epoxy moiety and the curative comprise a oxazole or amine moiety.

The invention may, in some preferred aspects, be characterized by any combination of steps and/or features that are described in the Detailed Description or Examples. The invention also can be characterized by any of the test conditions and/or physical characteristics mentioned in the Examples but within a scope of ±30%, ±20%, or ±10% of the values shown in the examples. In this regard, the invention can, in selected embodiments, be characterized in terms of values selected from the graphs over any selected range (for example, a selected temperature range or time range) including the entire reported range or any selected subset of the reported range.

The present invention, in various embodiments, may provide advantages such as one or more of the following: resistance to degradation; the ability to cure well in the sustained presence of linear hydroxyethylcellulose (HEC); a reservoir of unreacted moieties within the proppant coatings to provide additional bonding potential and enhanced durability; the ability to form a porous proppant network that remains unclogged for the life of the producing well (preferably in the range of 10-20 years); and/or the ability to remain stable at (down-hole) temperatures the range of 160-200° F. (70-93° C.) or higher.

DETAILED DESCRIPTION OF THE INVENTION

Figure 1:
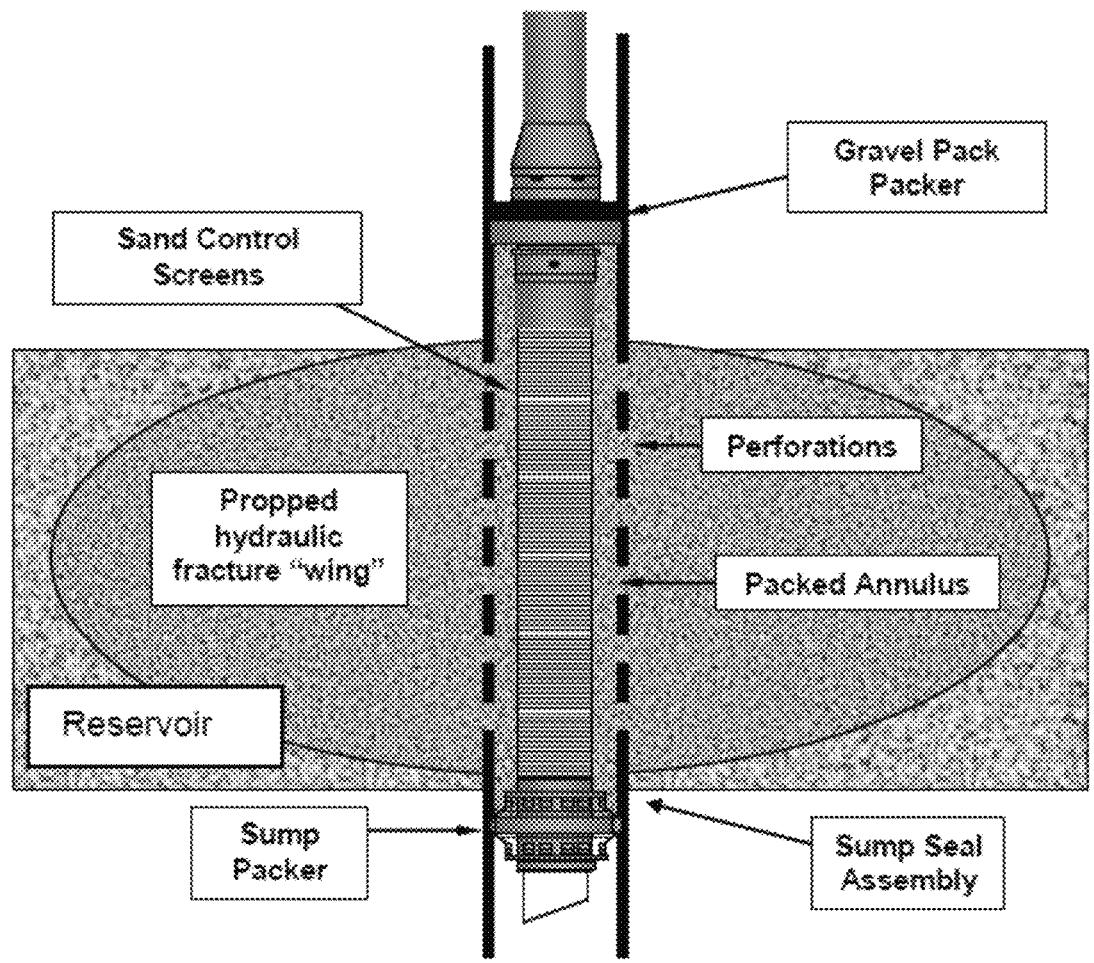
FIG. 1. Schematic of a sand control proppant placement. Not to Scale.
Figure 2:
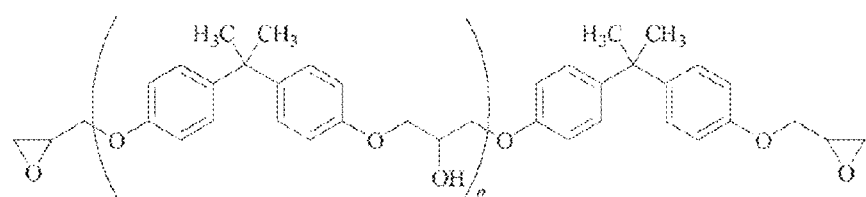
FIG. 2. Chemical Structure of Typical Bisphenol-A Epoxy
Figure 3:
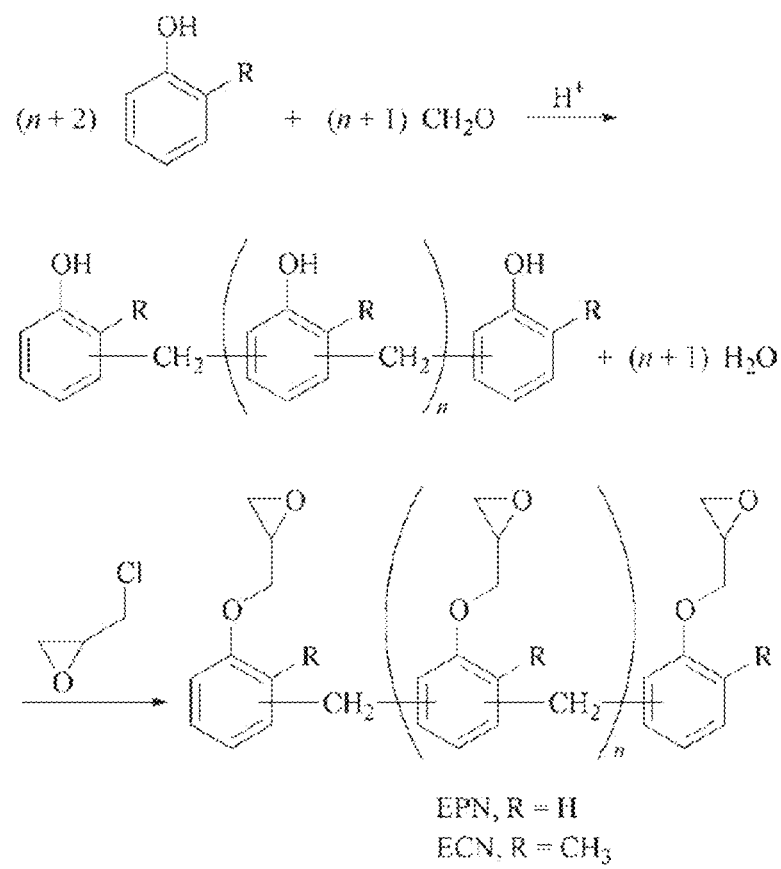
FIG. 3. Chemical Structures of Cresol and Novolak Epoxy Resins
Figure 4:
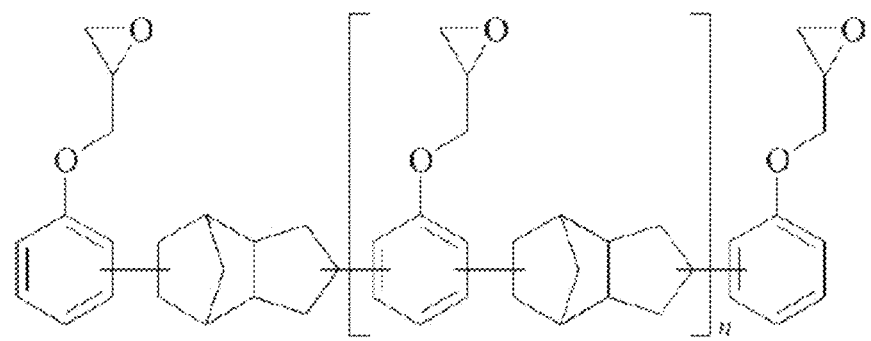
FIG. 4. Chemical Structure of Representative hydrocarbon ether epoxy Novolac
Figure 5:
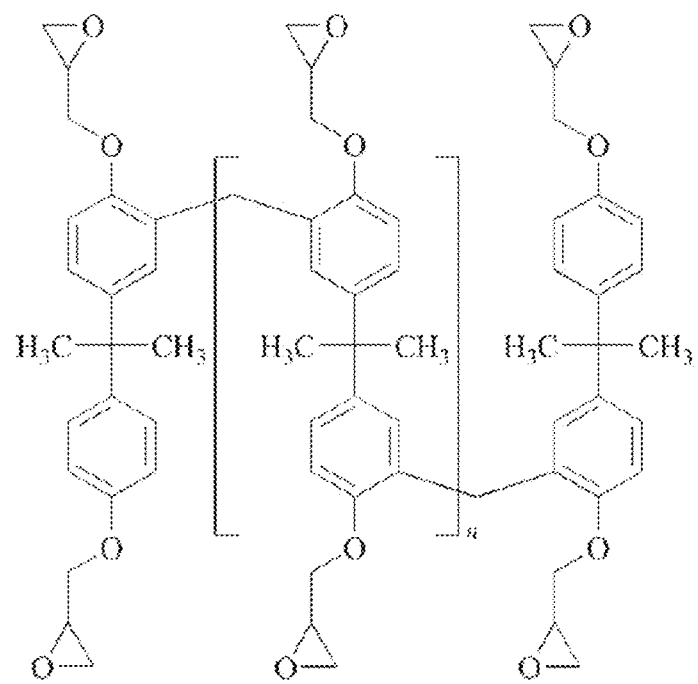
FIG. 5. Chemical Structure of a Bisphenol-A Epoxy Novolac

Representative Reactive Components Useful for this Invention

Representative classes of epoxy and epoxy curatives, useful for the purposes of this invention include, but are not limited to:

High Molecular Weight (MW) Solid Epoxy Resins (SERs) Based on DGEBA

"High molecular weight (MW) Solid Epoxy Resins (SERs) based on DGEBA are characterized by a repeat unit containing a secondary hydroxyl group with degrees of polymerization, i.e., n values ranging from 2 to about 35 in commercial resins; two terminal epoxy groups are theoretically present. The epoxy industry has adopted a common nomenclature to describe the SERs. They are called type "1," "2" up to type "10" resins, which correspond to the increased values of n, the degree of polymerization. Examples of SERs are D.E.R. 661, 662, 664, 667, 669 resins from Dow Chemical, and

TABLE 2

DGEBA-based epoxy resins

| Resin type | n value | EEW (g/eq) | Mettler softening point, ° C. |
|---|---|---|---|
| Standard grade LER | 2 | 185-195 | liquid |
| Type 1 SER | 3 | 450-560 | 70-85 |
| Type 4 SER | 5 | 800-950 | 95-110 |
| Type 7 SER | 15 | 1,600-2,500 | 120-140 |
| Type 9 SER | 25 | 2,500-4,000 | 145-160 |
| Type 10 SER | 35 | 4,000-6,000 | 150-180 |
| Phenoxy resin | 100 | >20,000 | >200 |

Multifunctional Epoxy Resins: Epoxy Phenolic Novolacs (EPN) and Epoxy Cresol Novolacs (ECN)

The multifunctionality of these resins provides higher cross-linking density, leading to improved thermal and chemical resistance properties compared to bisphenol-A epoxies.

Epoxy novolacs are based on phenolic formaldehyde novolacs. Both epoxy phenol novolac resins (EPN) and epoxy cresol (with an ortho methyl group) novolac resins (ECN) are well known. They are made by epoxidation of the phenol-formaldehyde condensates (novolacs) obtained from acid-catalyzed condensation of phenol (or cresol) and formaldehyde. This produces random ortho and para-methylene bridges. EPN and ECN resins range from a high viscosity liquid to a solid of n>3. The epoxy functionality is between 2.2 and 3.8.

Glycidyl Ethers of Hydrocarbon Epoxy Novolacs

Hydrocarbon epoxy novolacs (HENs) exhibit a much better water resistance compared to cresol or phenol epoxy novolacs. Examples include TACTIX 556 from Huntsman, which is based on the alkylation product of phenol and dicyclopentadiene (272 EEW; softening point 85° C.). Similar products based on o-cresol are made by DIC (e.g. EPICLON HP-7200L).

Bisphenol A Epoxy Novolacs

Bisphenol A novolacs are produced by reacting bisphenol A and formaldehyde with acid catalysts. Epoxidation of the bisphenol A novolacs gives the bisphenol A epoxy novolac (BPAN).

Glycidyl Ether of Tetrakis(4-hydroxyphenyl)ethane

A polyfunctional resin marketed (by Shell) is based on 1,1,2,2-tetrakis[4-(2,3-epoxypropoxy)phenyl]ethane and is prepared by reaction of glyoxal with phenol in the presence of HCl. The tetraglycidyl ether (mp~80° C., and an EEW of 185-208) possesses a theoretical epoxide functionality of 4. Commercial products include Araldite 0163 (Huntsman) and Epon 1031 (Resolution)[3].

[3] Ullmann's Polymers and Plastics: Products and Processes

Crystalline Epoxy Resins

Examples include some crystalline solid epoxies with very low melt viscosity based on tetramethyl-biphenol by Yuka-Shell as well as some based on di-hydroxynapthalene.

One common example is triglycidyl isocyanurate (TGIC) or, 1,3,5-tris(2,3-epoxypropyl)-1,3,5-perhydrotriazine-2,4, 6-trione, marketed as PT 810 by Huntsman. It is a crystalline compound (mp 85-110° C.) with an EEW of ~108 and is widely used in outdoor powder coatings with polyesters.

Part B Components: Curing of Epoxy Resins

Co-Reactive Curing Agents

Figure 10:
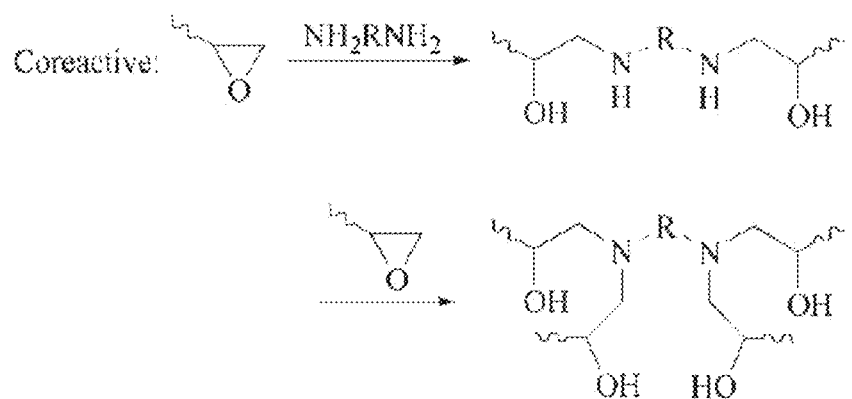
FIG. 10. Co-reactive Incorporation of Diamine Curing Agent
Figure 11:
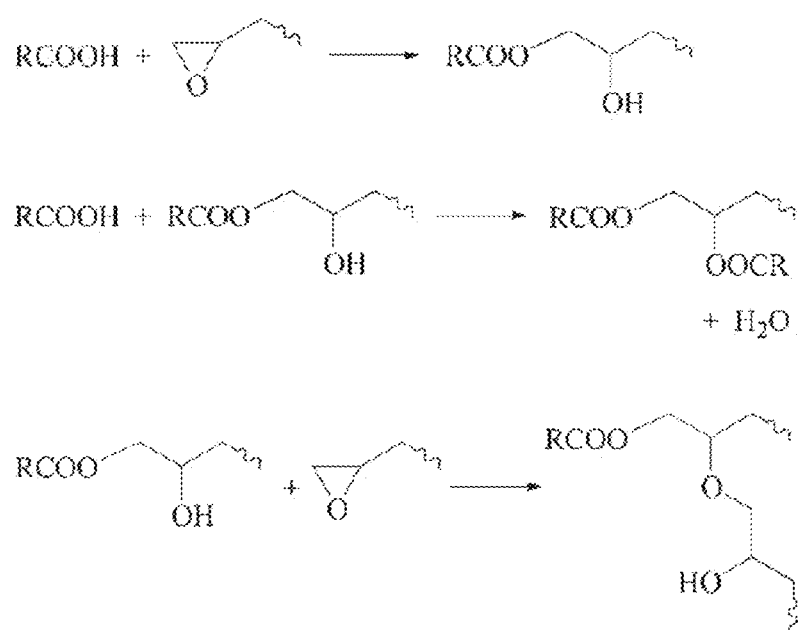
FIG. 11. Reaction of Carboxylic Acid Curing Agents with an Epoxy Resin.

Most epoxy curing agents are co-reactive and act as a co-monomer in the polymerization process. The majority of epoxy curing occurs by nucleophilic mechanisms with active hydrogen atoms, e.g., primary and secondary amines, phenols, thiols, and carboxylic acids (and their anhydride derivatives). The reaction of a primary amine curing agent with the oxirane group of an epoxy resin are shown in the FIG. 10.

Primary and Secondary Amines

Primary and secondary amines (and adducts based on them) are the most widely used curing agents for epoxy resins. The number of amine hydrogen atoms present on the molecule determines the functionality of an amine. A primary amine group which has two hydrogens bound to it may react with two epoxy groups while a secondary amine will react with only one epoxy group. A tertiary amine group, which has no active hydrogen, will not react readily with the epoxy group.

Carboxylic Acid and Anhydride Functional Polyesters

Carboxylic polyesters and anhydrides are the second most important class of epoxy curing agents. The curing mechanism of epoxy-polyester thermosets involves reaction of the acid functionality with epoxy followed by esterification of the epoxy hydroxyl groups with the acids.

Phenolic-Terminated Curing Agents

Phenolics form a general class of epoxy curing agents containing phenolic hydroxyls capable of reacting with the epoxy groups. They include phenol-, cresol-, bisphenol-A based novolacs and bisphenol-A terminated epoxy resin hardener. Cure takes place at elevated temperatures (150-200° C.) and amine catalysts are often used. Bisphenol-A terminated hardeners are produced using liquid epoxy resins and excess Bisphenol-A. Novolacs are produced via the condensation reaction of phenolic compounds with formaldehyde using acid catalysts and are precursors to epoxy novolacs.

Mercaptans (Polysulfides and Polymercaptans) Curing Agents

The mercaptan group of curing agents includes polysulfide and polymercaptan compounds which contain terminal thiols.

Cyclic Amidines Curing Agents

Cyclic amidine curing agents are typically used in epoxy powder coating formulations. For example, 2-Phenyl imidazoline is highly reactive, curing at relatively low temperatures (140° C.) making it suitable for curing of coatings on temperature-sensitive substrates such as wood and plastics. For purposes of the present invention, amidines are considered to be a subset of amines. Other curing agents in this group include salts of polycarboxylic acids and cyclic amidines.

Catalytic Cure

The catalytic curing agents are a group of compounds that promote epoxy reactions without being consumed in the process. Imidazoles such as 2-methylimidazole (2-MI) and 2-phenylimidazole (2-PI) contain both a cyclic secondary and a tertiary amine functional groups and are used as catalysts, catalytic curing agents, and accelerators. Some of the preferred formulations of this invention contain imidazole catalysts, and others have polymer bound imidazoles that co-react into the final resin binder, while in some blended formulations, such as Epikure P202/P100, both are present.

Multi-Component Solid Epoxy Proppant Binder (MCE)

MCE Proppant Binder System Attributes

The proppant particles are coated with either an epoxy resin or an epoxy curing agent(s) that have high melting points near the activation temperature (for example, about 160-200° F.) of the down-hole environment. At lower temperatures, these proppant coatings are solid. Due to the limited molecular mobility of the solid chemical components, part A and part B resin coated proppants can be mixed together without the curing reaction taking place.

The B1 and B2 components do not react with each other, only with the Part A component beads. They form a 3-D proppant pack composed of System 1:3 beads (A+B1+B2) or System 2: two beads (A+(B1/B2 blend)). Once the proppant pack temperature increases, the resin (Part A) and the curing agent (Part Bs) begin to soften and the network begins to crosslink. In the three-bead case, first an interpenetrating network of the Part A and the faster reacting (B2) forms with unreacted spacer (B1) particles that later integrates into the network to form the final crosslinked system.

The MCE binder systems show very little cure during the period of time 1-3 days, following injection, while the formation temperature rises back to ~160-200° F., but develops a strong porous network over the next several days. Once cured, the filter-pack can withstand a large water injection flux, e.g. >20 gallon/min across 2-inch cross-section for an extended time at low back-pressure (<30 psi).

MCE binder systems cure without external pressure at 1 G, and can be formulated and delivered in an HEC slurry. It cures and provides the same strength under both KCl brine-washed and "worst-case" where HEC gel is left surrounding the proppant mass.

The two-bead (B1/B2 blend) and the three-bead (A, B1, B2 components) offer fine tuning for initial consolidation and final strength development in a manner that cannot be attained under single component systems.

Glossary

"Epoxide," in the context of the present invention refers to the oxirane functional group that cures via the epoxy curing reaction. A "epoxy curative" is a moiety comprising amines, hydroxyls, carboxyls or thiols, that reacts with an epoxide, via the epoxy curing reaction. A "proppant" refers to a particle such as sand or a man-made particle which is sufficiently insoluble under conditions underground to resist disintegration. Because the proppants can be used to form a porous network around a wellbore; and are not necessarily required to prop open fractures in an underground formation, they need not have the hardness required of conventional proppants. Essentially, the proppants of the present invention can be any particle that can carry a resin coating and resist disintegration under conditions present in the vicinity of a water injection or production wellbore.

A "resin" is an organic substance that is solid or highly viscous at temperatures up to at least 50° C. so that resin-coated particles are free-flowing at ambient conditions. Typically, "resin" refers to any of numerous polymerized synthetics or chemically modified natural resins including thermoplastic materials and thermosetting materials.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of." As used in this specification, the terms "includes" or "including" should not be read as limiting the invention but, rather, listing exemplary components.

If there is any conflict in the usages of a word or term in this specification and one or more patent or other documents mentioned herein, the definitions that are consistent with this specification should be adopted for the purposes of understanding this invention.

DETAILED DESCRIPTION OF THE INVENTION

Traditional processes to produce resin coated proppants are described in Graham et al. (U.S. Pat. No. 3,929,191) and are incorporated herein by reference. The particulate material may be coated by dissolving powdered resin in a suitable solvent, mixing the resulting solution with the particles, and finally evaporating the solvent. The final product is a composite material consisting of a substrate and an encapsulating coating of a solid resin. This particulate material is characterized as free flowing and can be stored for relatively long periods of time at surface temperatures without appreciable agglomeration. A hot coating process may also be used. This technique involves preheating the particles, slowly adding a fusible resin to the substrate; mixing the substrate and the resin until the resin melts and completely coats the individual particles; and finally cooling the coated particles to return the resin to the solid state.

Traditionally, coating procedures are carried out in very large (e.g., 20,000 lb) batch kettles. In the case where very hard e.g. ceramic beads are the proppants to be coated, they can cause scratching and damage to steel reactor kettle walls, stirrers and conveyors. A preferred method used in the current invention is a particularly novel one involving no direct contact of the proppant beads with anything other than themselves and the polymeric container (e.g. HDPE, PP, Teflon, etc.) in which they are mixed.

For the purposes of the present disclosure, the term proppant will be used to refer to any particulate solid material, which is stable at the conditions that will be encountered in the producing formations over a long period of time. Specifically, it is preferred that the granular material be hard, rigid, generally spheroidal particles of material which are substantially inert to crude oil, natural gas, water, brine and other fluids naturally present in subterranean formations and producing wells, as well as to fluids commonly injected into subterranean petroleum formations for the purpose of stimulating oil production.

Particulate substrates, or proppants, also termed "particles" herein, suitable for use with the present invention can be selected from any propping agent suitable for hydraulic fracturing known in the art. Examples include, but are not limited to, natural materials, silica proppants, ceramic proppants, metallic proppants, synthetic organic proppants, sintered bauxite, and combinations thereof.

Natural products suitable for use as particulates in the present disclosure include, but are not limited to, nut shells such as walnut shells, brazil nut shells, and macadamia nut shells, as well as fruit pits such as peach pits, apricot pits, olive pits, and any resin impregnated or resin coated version of these.

Silica particles suitable for use with the present invention include, but are not limited to, glass spheres and glass microspheres, glass beads, silica quartz sand, silicon carbide, and sands of all types such as white or brown. Typical silica sands suitable for use include Ottawa, Jordan, Brady, Hickory, Ariz., and Chelford, as well as any resin coated version of these sands.

Other suitable proppants include a variety of naturally occurring minerals and their oxides. Such compounds include alumina, cordierite, gilsonite, mullite, calcium oxide, and zirconium oxide.

Ceramic proppants suitable for use with the methods of the present invention include, but are not limited to, ceramic beads, ceramic oxides, ultra lightweight porous ceramics, economy lightweight ceramics such as "EconoProp®" or "ValuProp®" (Carbo Ceramics, Inc.), lightweight ceramics such as "CarboLite®" or "Naplite®" (Carbo Ceramics, Inc.), intermediate strength ceramics such as "CarboProp® 40 (" (Carbo Ceramics Inc.) or "Interprop®" (Norton Proppants), and high strength ceramics such as "CarboHSP®" (Carbo Ceramics, Inc.), "Sintered Bauxite™" (Norton Proppants), "SinterLite", "SinterbalFM" (Sintex Minerals & Services, Inc.), or "Versaprop" (Norton Proppants) as well as any resin coated or resin impregnated versions of these.

Metallic particles suitable for use with the embodiments of the present invention include, but are not limited to, aluminum shot, aluminum pellets, iron shot, steel shot, and the like, as well as any resin coated versions of these metallic proppants.

Synthetic particles are also suitable for use with the present invention. Examples of suitable synthetic particles include, but are not limited to, plastic particles or beads, nylon beads, nylon pellets, SDVB beads, and resin agglomerate particles similar to "FlexSand MS", as well as resin coated versions thereof.

As a practical matter, naturally occurring particulate materials such as small pebbles, gravel or sand are often used. The particle size distribution is not critical and any size proppant can be used. The preferred proppant has a predominant portion of its particle size in the range of 20 mesh to 40 mesh, or 16 mesh to 30 mesh, with the actual distribution further restricted based on the well to be treated. Suitable mesh sizes (U.S. Sieve Series) for use with the present invention include 8/12, 8/14, 8/16, 12/18, 12/20, 16/20, 16/30, 20/40, 30/50, and 40/70. Generally, the 20/40 mesh proppant comprises the majority of the product used. However, both larger and smaller grain proppants are required for different types and depths of wells." See Sinclair et al. U.S. Pat. No. 7,135,231 is incorporated herein by reference as if reproduced in full below.

The preferred proportions of the two component (A:B) MCE RCP are preferably in the range from 10:1 to 1:10, more preferably in the range 2:1 to 1:2, and most preferably within 10% of a 1:1 ratio by number of particles of each (in some embodiments, these ratios correspond to mass or volume in place of number). The preferred proportions of the three component MCE (A:B1:B2) RCP are preferably in the range from 10:0.5:0.5 to 1:5:5, more preferably in the range 2:0.5:0.5 to 1:1:1, and most preferably within 10% of a 1:1 ratio by number of particles of each A and B1+B2 (in some embodiments, these ratios correspond to mass or volume in place of number).

The preferred coating thickness on the RCP is a function of the individual resin component density as well as the desired performance properties for the proppant pack. For example a nominal 3 wt % Part A RCP may have a coating thickness of ~100 mm on a 16/20 mesh proppant (~850 µm-~1180 µm) compared with ~170 µm for a nominal 5 wt % loading. With the thicker coating thickness it has been observed that a higher UCS strength and hydraulic flow stability can be obtained. However, the larger diameter RCP for the 5 wt % loading also lowers the free porosity between particles and lowers the permeability (or production for oil and gas removal) or increases the back pressure for water injection well applications. We have found that a balance of strength and permeability can be achieved based on the formation requirements. In some embodiments, the uncoated proppants have a mesh size in the range of 20 to 40, more preferably, in the range of 16 to 30. In some embodiments, the coated proppants have a mesh size in the range of 18 to 30, more preferably, in the range of 18 to 35. In other embodiments, the coated proppants have a mesh size in the range of 14 to 20, more preferably, in the range of 16 to 25. The resin thickness is preferably in the range of 10 µm to 200 µm, in some embodiments in the range of 20 µm to 150 µm, in some embodiments in the range of 50 µm to 120 µm.

Some embodiments of the invention are based on binding proppant particles together using a multi-component (Part A, Part B) multi-bead approach based on an epoxy resin cured proppant pack. The proppant particles are coated with either epoxide (A) or epoxy curative (B) functional polymers that have high melting points near the activation temperature (~160-200° F.) of the down-hole environment. At lower temperatures, these proppant coatings are solid. Due to the limited molecular mobility of the solid chemical components, part A and part B resin coated proppants can be mixed together without extensive epoxy coupling reaction taking place. Once the proppant pack temperature increases, the resin begins to crosslink and the network is formed.

Typically, the binder system shows very little cure during the period of time 1-3 days, following injection, while the formation temperature rises back to ~160-200° F., but develops a strong porous network over the next several days. Once cured, the filter-pack can withstand a large water injection flux, e.g. >300 gallon/min through a ~8-inch diameter pipe casing across a 1-inch thick section for the lifetime of the injection well at low back-pressure (e.g. 30-40 psi). In laboratory tests typical pipe diameters may be ~2 inches in diameter and an equivalent water flow of ~20 gallon/minute can be used.

Typically, the binder system cures without external pressure at 1 G, and can be formulated and delivered in a HEC slurry. The subject epoxy binders have been found to not cure as well, if at all, in crosslinked guar. Although not wishing to be bound by theory, this may be due to the high basic (pH>10) conditions needed for borate crosslinking of Guar, which disrupts the epoxide curing transition state. Surprisingly, the MCE binder cures in the presence of carrier fluid liquid, for example, under both KCl brine-washed and where HEC gel is left surrounding the proppant mass.

Preferred Embodiments of the Invention

Figure 12:
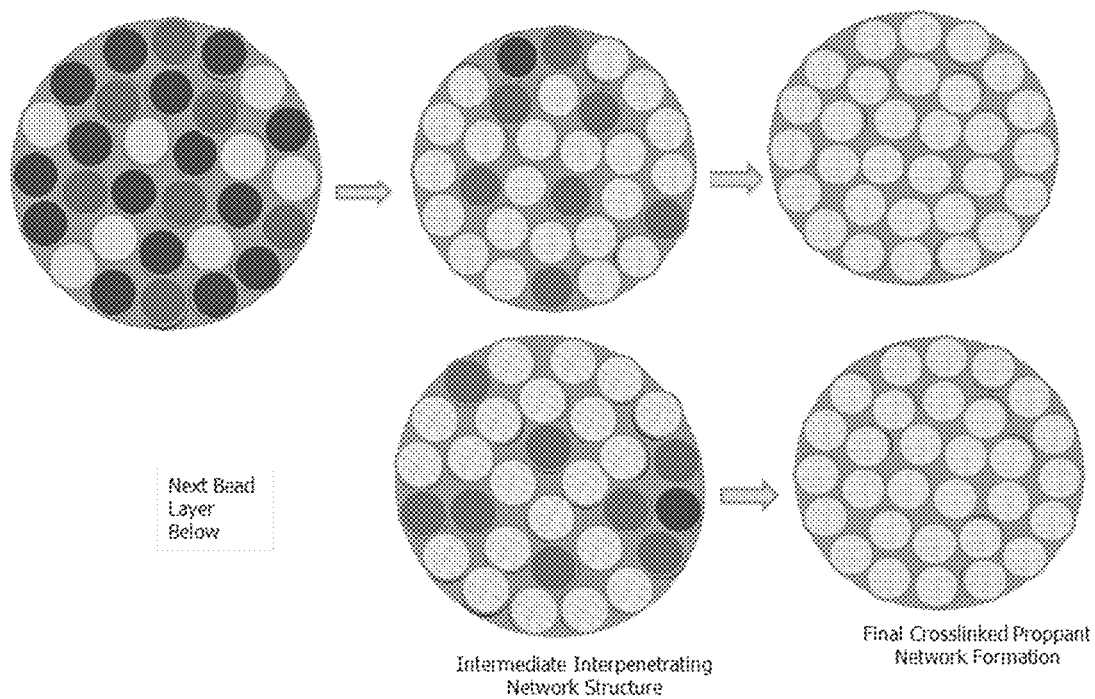
FIG. 12. Depiction of Three-component Three bead formulation (System 1)

Binder System #1 (MCE-A-B1-B2) Three-bead Three Component Technology The technology was designed based on treating each coated bead as a separate reactant, with each bead of a first type adjoining a plurality of beds of a second type, for example, a bead of a first type having up to six nearest-neighbor contacting co-reactants. In preferred embodiments, the chosen mixing ratio of part A and part B coated proppants in this technology in a ratio of about 1:1 based on weight (number of beads) and not based on the stoichiometry of epoxy equivalent weight to hardener equivalent weight. As long as the Part A, Part B (Part B1, Part B2) beads are mixed thoroughly prior to cure, the 3-D interpenetrating network can provide its maximum strength. Although short-range ordered structures are possible, typically the proppants form a network without long-range order. A depiction of a 3-bead system is shown in FIG. 12.

The Part A coated beads react with the faster reacting Part B2 coated beads, which enables early-stage lower T particle consolidation. Subsequent reaction of Part A beads with slower reacting (higher onset temperature) Part B1 coated beads provides delayed final proppant network crosslinking, which is better for extended tool-rig removal time. A preferred embodiment is 3-component 3-bead formulation based on a 50(A):25(B-1):25(B-2) mixture of three types of coated Carboprop HSP proppant beads: Part A (DER 663U) (50%) with 25% Part B-1 (Epikure P-202) and 25% Part B-2 (Epikure P-100).

Binder System #2 (MCE-A-B1/B2) Two-Bead (Two or Three Component) Technology

Figure 13:
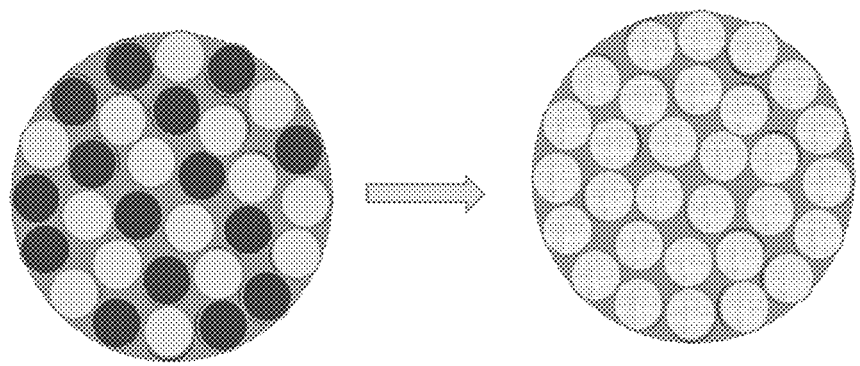
FIG. 13. Depiction of the Two-Bead Three-Component (One can be a Blend of B1/B2) Binder (System 2)
Figure 14:
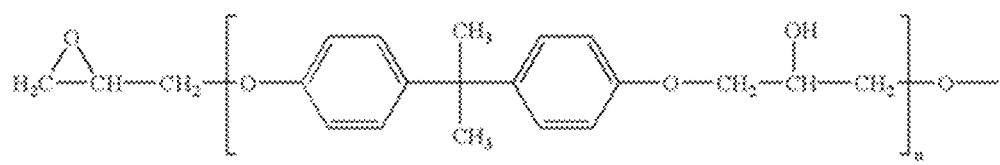
FIG. 14. Preferred Embodiment DER 663U(Part A Component) (n=~2, ~1480 MW)
Figure 14:
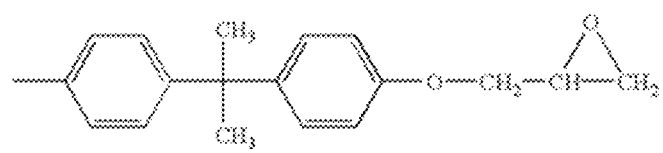

Binder System 2 is a 2-component (one can be a blend of B1 and B2) 2-bead 50(A):50(75/25 B-1/B-2) mixture of two types of coated proppant beads: Part A (e.g. DER 663U) and the other coated with a 75:25 blend of the slow curing B-1: P-202 and the faster curing B-2: P-100 components. Further tuning of the time-temperature-curing profile with blend ratio is possible. A depiction of the 2-bead System 2 is shown in FIG. 13.

Providing the A and B components on separate beads permits rapid formulation tuning to local formation cure temperature conditions vs 1-bead pre-reacted epoxy-hardener coated RCP. In this case, the B2 rich blend regions in contact with the Part A coated beads react first, which enables early-stage lower T particle consolidation. The remaining B1 blend component rich regions already in contact with Part A coated beads provides a delayed final proppant network crosslinking for extended tool-rig removal time. Using a combination of A-B1 and A-B2 blend ratio provides flexibility to tune the system cure based on downhole temperature.

The proppant particles are coated with either an epoxy resin or an epoxy curing agent(s) that have high melting points near the activation temperature (~160-200° F.) of the down-hole environment. At lower temperatures, these proppant coatings are solid. Due to the limited molecular mobility of the solid chemical components, part A and part B proppants can be mixed together without the curing reaction taking place.

Figure 15:
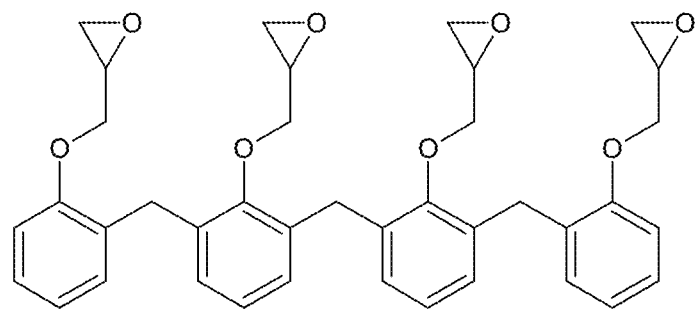
FIG. 15. Chemical Structure of Epon 154 Epoxy-functional Novolak Resin Component A (n=3.6)
Figure 16:
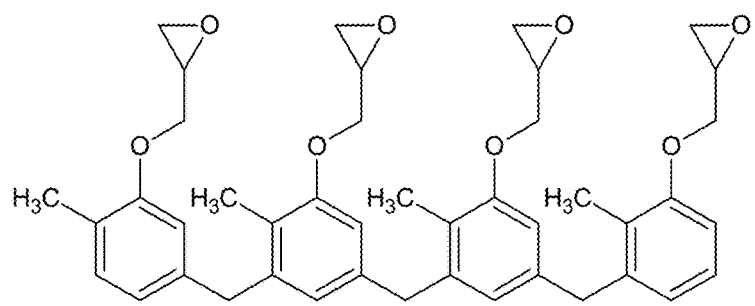
FIG. 16. Chemical Structure of Epon 164 Epoxy-functional Cresol Resin Component A (n=4.1)
Figure 17:
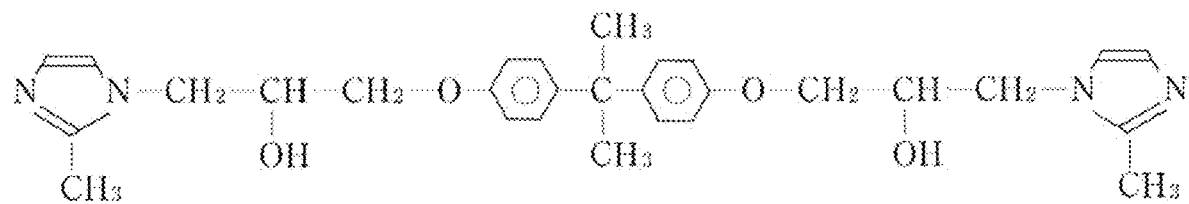
FIG. 17. Chemical Structure of Epikure® P-100 (Momentive)-Solid imidazole epoxy adduct curing agent FIG. 18. Chemical Structure of Epikure® P-202 (Momentive)-Solid phenolic hydroxyl terminated curing agent.
Figure 18:
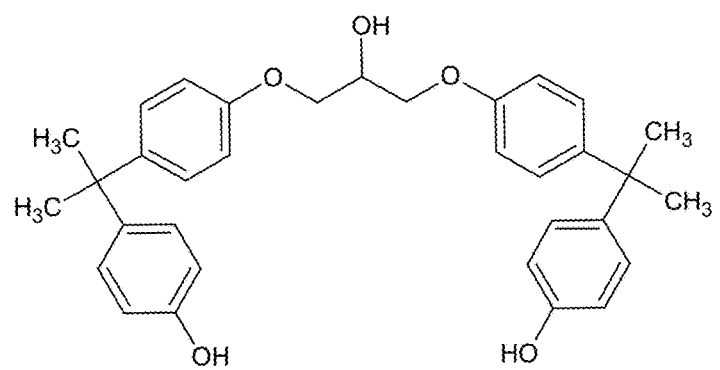

Component A: D.E.R™ 663U (DOW)—Solid Epoxy Functional Resin Based on Epichlorohydrin/Bisphenol A Other preferred Part A components useful in this invention include Novolak and Cresol polymer backbones e.g. Epon 154 and Epon 164 and are depicted in FIG. 15 and FIG. 16, respectively. Experimental test data using all three Part A systems is presented in the examples section. P-202 Phenolic hydroxyl terminated solid flaked curing agent. Contains 2-methylimidazole that functions as an accelerator to reduce the cure cycle.

The coating on a proppant should be solid to prevent washoff during slurry, delivery and flushing. Also, in the case of proppants that have A and B components on the same particle, prior to downhole delivery, the A and B components should not be in a homogeneous mixture and should not be in a dispersed phase A-B mixture (that is, a resin layer having droplets of A dispersed in a B layer (or vice versa) should be avoided). The temperature at which two solid components can mix well together may depend on the melting points of each component. Consider, for example, a case in which the melting point of component A is ~92° C., which is ~200° F., at the upper end of our downhole curing temperature tests (and ~DA reaction onset). Without the application of shear at high temperature, the components will not mix, and since the required temperature is greater than the Epoxy reaction temperature, they will react even before they completely mix. Once the proppant particles have been mixed into carrier fluid and delivered down-hole, there is not further shear between particles, just "static" 1 G contact.

An alternative form of a multilayer bead system has been produced for the subject invention in which the outer layer is not reactive, but instead serves as a protective coating for the dry proppant-resin composition. For example, a protective coating release layer may comprise one or more of any one of several PVP or HMC base water-soluble "immediate release" coatings such as Kollicoat IR® (BASF), OPAdry® (ColorCon). The protective coating release layer may serve to enhance particle flow, reduce dusting potential, improve storage stability in elevated temperature/humid environment, and prevent reaction between particles during storage, for example, in a single bag particle mixture, as well as during handling e.g., pneumatic air-line dry transfer to/from barges, storage containers or oil-rigs.

The protective coating dissolves when submerged in water for a period of time and the resulting proppants with exposed reactive coatings can then react as described above. The result is the same binding strength with a modest increase in cure-time.

Table 3: Representative Classes of Epoxides for the Purposes of this Invention

TABLE 2

Representative classes of epoxides for the purposes of this invention

| Product | Chemical Type: DGEBPA | Weight per Epoxide (g/eq) | Softening Point ° C. |
| --- | --- | --- | --- |
| D.E.R.™ 661 | D.E.R. 661 solid epoxy resin is a standard "1-type" epoxy resin. | 500-560 | 75-85 |
| D.E.R. 6116 | Low molecular weight "1.5-type" epoxy resin. | 520-560 | 80-90 |
| D.E.R. 662E | D.E.R. 662E solid epoxy resin is a standard "2-type" epoxy resin. | 590-630 | 87-93 |
| D.E.R. 6224 | Low molecular weight "2.5-type" epoxy resin. | 675-725 | 88-98 |
| D.E.R. 662UH | Low molecular weight "2.5-type" epoxy resin. | 675-750 | 90-98 |
| D.E.R. 663U | Low molecular weight "3-type" epoxy resin. | 730-820 | 92-102 |
| D.E.R. 663UE | Low molecular weight "3-type" epoxy resin. | 740-800 | 98-104 |
| D.E.R 664 | Low molecular weight "4-type" epoxy resin. | 875-955 | 100-110 |
| D.E.R. 664U | Medium molecular weight "4-type" epoxy resin. | 875-955 | 100-110 |
| D.E.R. 664UE | Medium molecular weight "4-type" epoxy resin. | 860-930 | 104-110 |
| D.E.R. 6330-A10 | Low molecular weight solid epoxy resin containing 10 wt % polyacrylate flow modifier. | 780-900 | 98-106 |
| D.E.R. 642U | Novolac-modified, medium molecular weight solid epoxy resin. | 500-560 | 89-97 |
| D.E.R. 672U | Novolac-modified, high molecular weight solid epoxy resin. | 740-830 | 110-120 |
| D.E.R. 6225 | Modified bisphenol A solid epoxy resin. | 650-725 | 87-95 |
| D.E.R. 6508 | High temperature performance solid epoxy resin. | 380-420 | 95-105 |
| D.E.R. 6155 | High molecular weight "5-type" epoxy resin. | 1250-1400 | at 150 C. |

Typical Properties of EPON™ Solid Epoxy Resins—Powder Coating and Molding Grades

TABLE 3

Representative Solid Epoxies for use in the present invention

| Product | Chemical Type: DGEBPA | Weight per Epoxide (g/eq) | Softening Point ° C. | Melt Viscosity at 150° C. (P) (ASTM D445-79) |
| --- | --- | --- | --- | --- |
| EPON 2002 | Medium low Mw solid epoxy resin. | 675-760 | 80-90 | 20-40 |
| EPON 2003 | Medium Mw solid epoxy resin. | 725-825 | 90-95 | 30-50 |
| EPON 2004 | Medium Mw solid epoxy resin. | 875-975 | 95-105 | 70-120 |
| EPON 2005 | Moderately high Mw solid epoxy resin. | 1,200-1,400 | 110-120 | >300 |
| EPON 2014 | Moderately high Mw solid epoxy resin modified with epoxy phenol novolac. | 750-850 | 100-120 | 200-600 |
| EPON 2024 | Medium Mw solid epoxy resin. | 850-950 | 95-105 | 60-120 |
| EPON 2041 | Medium low Mw solid epoxy resin. | 625-675 | — | — |

Typical Properties of EPON Solid Epoxy Resins—Fusion Grades

TABLE 4

Representative Solid Epoxies cont.

| Product | Chemical Type: DGEBPA | Weight per Epoxide (g/eq) | Softening Point ° C. | Melt Viscosity at 150° C. (P) (ASTM D445-79) |
| --- | --- | --- | --- | --- |
| EPON 1001F | Lowest Mw solid epoxy | 525-550 | 79 | 6-7.5 |
| EPON 1002F | Slightly higher Mw solid epoxy | 600-700 | 85 | 12-22 |
| EPON 1004F | Medium Mw solid epoxy resin with hydroxyl groups. | 800-950 | 96 | 40-60 |
| EPON 1007F | Moderately Mw solid epoxy resin | 1,700-2,200 | 125 | 500 |
| EPON 1009F | High Mw solid epoxy resin | 2,300-3,800 | 135 | >500 |

Typical Properties of EPON™ and EPIKOTE™ Epoxy Novolac Resins

TABLE 5

Representative Epoxy Novolak and Cresol Novolak Resins

| Product | Chemical Type | Weight per Epoxide (g/eq) | Melting Point ° C. (ASTM D3461) | Viscosity at 130° C. (P) (ASTM D445) |
|---|---|---|---|---|
| EPON 1031 | Tetraglycidyl Ether of Tetraphenol Ethane with a functionality of 3.5. | 195-230 | | 39 (15 @ 150 C.) |
| EPON SU-8 | Epoxy Bisphenol A novolac with a functionality of 8. | 195-230 | 82 | 10-60 |
| EPON 164 | Solid epoxy cresol novolac resin with a functionality of 4.1. | 200-240 | 80-85 | 35-50 (9-14 @ 150 C.) |
| EPON 165 | Solid epoxy cresol novolac resin with a functionality of 5.5. | 200-230 | 90-100 | 100-200 |

Huntsman

TABLE 6

Representative Huntsman solid epoxies useful for this invention

| Araldite GT | [25068-38-6] | Epoxy equivalent (ISO 3001) g/eq | Softening point (Mettler, DIN 51920) | Hydroxyl content (ISO/DIS 4629) eq/kg |
|---|---|---|---|---|
| 6071 | Solid, bisphenol-A based epoxy resin of medium molecular weight | 450-465 | 70-75° C. | 2.3 |
| 7071 | Solid, bisphenol-A based epoxy resin of medium molecular weight | 500-525 | 77-82° C. | 0 |
| 7072 | Solid, bisphenol-A based epoxy resin of medium molecular weight. | 570-595 | 82-90° C. | 0 |
| 6703 | High flow solid epoxy resin based on bisphenol-A. [67924-34-9] | 690-740 | 87° C. | 0 |
| 2874-1 | 90% Araldite GT 7004 and 10% polyacrylic acid butyl ester. | 740-870 | 85-95° C. | 0 |
| 6143 | Solid epoxy resin based on bisphenol-A. | 620-660 | 90-96° C. | 0 |
| 6063 | Solid, bisphenol-A based epoxy resin. | 640-730 | 90-97° C. | 0 |
| 7220 | Solid epoxy resin based on bisphenol-A and phenol novolak. | 520-545 | 95° C. | 0 |
| 7004 | Solid, type 3.5 bisphenol-A based epoxy resin. | 714-752 | 95-101° C. | 0 |
| 6064 | Solid, type 3.5 bisphenol-A based epoxy resin. | 730-780 | 96-101° C. | 0 |
| 6084-2 | Solid, type 4 bisphenol-A based epoxy resin. | 833-890 | 99-105° C. | 0 |
| 7255 | Solid epoxy resin based on bisphenol-A and phenol novolak. | 775-855 | 106-113° C. | 0 |
| 6097 | Solid, type 7, bisphenol-A based, high molecular weight epoxy resin. | 1695-1885 | 121-132° C. | 3.2 |
| 7077 | Solid, type 7, bisphenol-A based, high molecular weight epoxy resin. | 1490-1640 | 125-135° C. | 3.2 |
| 6810 | Solid, type 10, bisphenol-A based, high molecular weight modified epoxy resin. | >10000 | 130-160° C. | 3.4 |

TABLE 6-continued

Representative Huntsman solid epoxies useful for this invention

| Araldite GT | [25068-38-6] | Epoxy equivalent (ISO 3001) g/eq | Softening point (Mettler, DIN 51920) | Hydroxyl content (ISO/DIS 4629) eq/kg |
|---|---|---|---|---|
| 6609 | Solid, type 9, bisphenol-A based, low viscosity, high molecular weight epoxy resin. | 2380-2940 | 150° C. | 3.1 |
| 6610 | Solid, type 10, bisphenol-A based, low viscosity, high molecular weight epoxy resin. | 2940-3845 | 150° C. | 3.5 |
| 6099 | Solid, type 9, bisphenol-A based epoxy resin of high molecular weight. | 2380-2940 | 143-158° C. | 3.4 |

Components for this invention can include those that are mono-functional in epoxide or epoxy-reactive functionality, e.g. an epoxy terminated polyol, urethane or acrylate polymer e.g. 30374-35-7 Pentaerythritol, polymer with ethylene oxide and propylene oxide provided that the overall component provides sufficient molecular weight for structural properties, adhesion to or covalent reaction with substrate, and provides free reactive functionality for the final epoxy binder reaction.

Preferred resins useful for this invention are those that are multi-functional, with at least two linking groups per resin component, and can be the reaction product of a base oligomer or polymer and epoxy or epoxy-reactive pendant linking groups through non-Epoxy reaction grafting reactions that preserve the epoxy functionality. See Table 8 for examples. More preferred component resins of this invention include those that are solid or semi-solid at ambient temperature, with molecular weight sufficient to impart the shear modulus and binder strength needed for this application.

TABLE 7

Representative Part B Epoxy curatives

| | | MP (deg C.) |
|---|---|---|
| Epikure P-100 | Imidazole Adduct | 85-105 |
| Epikure P-202 | Phenolic | 75-85 |
| Epikure 168 | Phenolic | 80-90 |
| Epikure 3125 | Dimer Acid Polyamide | 75 |
| Epikure DDM | Diamine | 92 |
| Versamid 100 | Polyamide | 50 |
| Epikure P-104 | Dicyanimide Imidazole Adduct | >100 |

EXAMPLES

Example 1

Preparation of Binder Resin Coated Proppant (MCE-A) (Part A)

(Multibead Multicomponent Solid Epoxy (MCE) Polyphenolic Curing System: DER 663U (A))

Representative epoxy-functional resin binder component (DER 663U) coated proppant (Part A) was prepared using the following procedure. DER 663U is a solid bisphenol A based epoxy available from Dow. Into a pair of suitable containers (e.g. 550 mL Thinky® mixer cup (HDPE)) were each placed: 200 parts of suitable proppant (e.g. CarboLite® 16/20 (Carbo Inc), Carboprop HSP® 20/40 (Carbo Inc), Ottawa sand etc) and the corresponding amount of DER 663U to achieve the target loading. For example, to prepare a nominal 4 pph (3.85 wt %) loading 8 grams of DER 663U were added to 200 grams of proppant. Next, the containers were placed in a ~114° C. oven for ~60 minutes to soften, melt the mixture. Then, the pair of containers were mixed at ~1400 rpm for ~30 seconds using a Thinky® ARV-930T (twin container) centrifugal planetary mixer. Next, the containers were removed from the mixer and a metal spatula was used to scrape the material from the interior walls to the center of the mixing cup and the containers returned to the 114° C. oven for a period of time of at least 10 minutes to about 60 minutes depending on the number of containers being processed. Then, the pair of containers was returned to the Thinky® ARV-930T machine and mixed for a second and final cycle of ~30 seconds at ~1400 rpm. Finally, the containers were removed from the mixer and the resin coated proppant (Part A) was transferred to a large aluminum pan in a hood to cool to room temperature. A convenient method to reduce the product to a fine powder for resulting coating operations was to introduce a controlled amount of liquid nitrogen to a batch of product and crush and sieve to the desired particle size.

Example 2

Preparation of Binder Curing System #2 (MCE-B1/B2) Two-Bead One-Blend Technology Multibead Multicomponent Solid Epoxy (MCE) Polyphenolic Curing System: blend of Epikure P202 (B) with Epikure P100 curing agents on a single bead.

MCE-B1/B2 is a 2-component (one a blend of B1 and B2) 2-bead 50(A):50(75/25 B-1/B-2) mixture on two types of coated proppant beads. The Part A beads are coated with e.g. DER 663U (see Example 1) and the Part B beads are coated with a 75:25 blend of the slow curing B-1: P-202 and the faster curing B-2: P-100 components. Representative two-component blended epoxy-reactive-functional resin binder component (MCE-B1/B2) was prepared using the following procedure.

Figure 6:
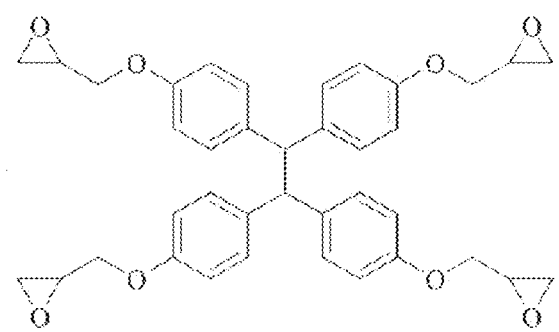
FIG. 6. Chemical Structure of Araldite 0163, Epon 1031 tetrafunctional epoxies
Figure 7:
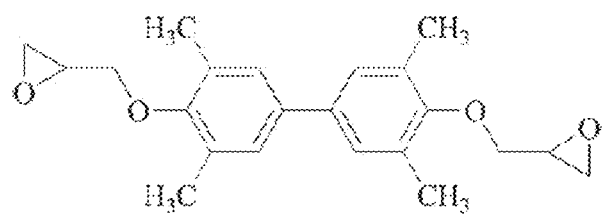
FIG. 7. Diglycidy ether of tetramethyl biphenol
Figure 8:
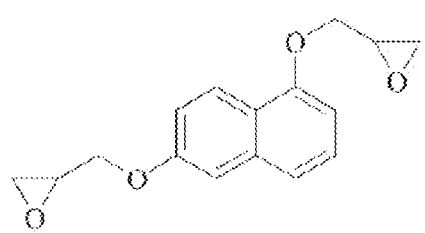
FIG. 8. Epoxy Resins based on Heterocyclic Glycidyl Imides and Amides
Figure 8:
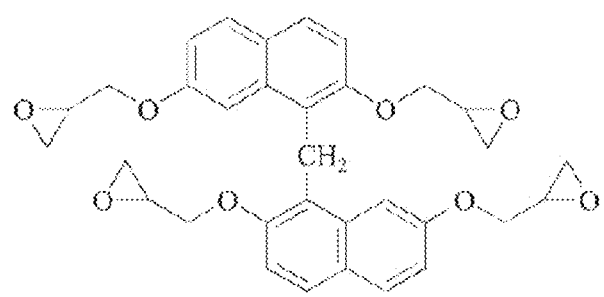
Figure 9:
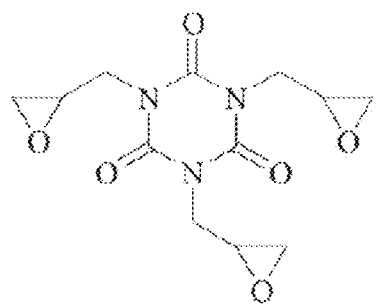
FIG. 9. Chemical Structure of TGIC

Epikure P202 is a solid polyphenolic epoxy-curative available from Dow (Momentive) made by reacting Bisphenol A and the diglycidylether of Bisphenol A (Epon 828)[4]. Epikure P202 contains 2-methylimidazole that functions as an accelerator to reduce the cure cycle. Epikure® P-100 (Momentive) is a solid imidazole adduct of Bisphenol A (see FIG. 6) used for curing epoxy p-coatings. Into a pair of suitable containers (e.g. 550 mL Thinky® mixer cup (HDPE)) were each placed: 150 parts Epikure P202 (solid) and 50 parts Epikure P100 (solid). Next, the containers were placed in a ~114° C. oven for ~60 minutes to soften, melt the mixture. Then, the pair of containers were mixed at ~1400 rpm for ~30 seconds using a Thinky® ARV-930T (twin container) centrifugal planetary mixer. Next, the containers were removed from the mixer and a metal spatula was used to scrape the material from the interior walls to the center of the mixing cup and the containers returned to the 114° C. oven for at least 10 minutes to ~60 minutes depending on the number of containers being processed. Then, the pair of containers was returned to the Thinky® ARV-930T machine and mixed for a second and final cycle of ~30 seconds at ~1400 rpm. Finally, the containers were removed from the mixer and the intimate mixture of the epoxy curatives was transferred to a large aluminum pan in a hood to cool to room temperature. The elevated temperature was found to be a convenient one-step production in line with the same process parameters utilized for coating of proppant beads with the final reaction product. A convenient method to reduce the product to a fine powder for resulting coating operations was to introduce a controlled amount of liquid nitrogen to a batch of product and crush and sieve to the desired particle size.

[4] Marx et al, U.S. Pat. No. 4,767,832 Aug. 30, 1988 "PHENOLIC CURING AGENTS FOR EPOXY RESINS", Shell Oil Co.

Example 3

Preparation of Two-Bead Two-Component Resin Coated Proppant (RCP) (Part B1/B2)

Preparation of Binder Resin Coated Proppant (MCE-B1/B2) (Part B)

Multibead Multicomponent Solid Epoxy (MCE) Polyphenolic Curing System: DER 663U (A) and/or Epon 164 and blend of Epikure P202 (B1) with Epikure P100 (B2) curing agents on separate beads.

Representative epoxy-reactive functional resin binder component coated proppant (MCE-B 1/B2) was prepared using the following procedure. There are a number of suitable epoxy-reactive binder components that can be utilized. A preferred embodiment is to use the MCE-B 1/B2 binder as described in Example 2. Into a pair of suitable containers (e.g. 550 mL Thinky® mixer cup (HDPE)) were each placed: 200 parts of suitable proppant (e.g. CarboLite® 16/20 (Carbo Inc), Carboprop HSP® 20/40 (Carbo Inc), Ottawa sand etc) and the corresponding amount of MCE-B1/B2 to achieve the target loading. For example, to prepare a nominal 4 pph (3.85 wt %) loading 8 grams of MCE-B1/B2 were added to 200 grams of proppant. Next, the containers were placed in a ~114° C. oven for ~60 minutes to soften, melt the mixture. Then, the pair of containers were mixed at ~1400 rpm for ~30 seconds using a Thinky® ARV-930T (twin container) centrifugal planetary mixer. Next, the containers were removed from the mixer and a metal spatula was used to scrape the material from the interior walls to the center of the mixing cup and the containers returned to the 114° C. oven for a period of time of at least 10 minutes to about 60 minutes depending on the number of containers being processed. Then, the pair of containers was returned to the Thinky® ARV-930T machine and mixed for a second and final cycle of ~30 seconds at ~1400 rpm. Finally, the containers were removed from the mixer and the resin coated proppant (MCE-B1/B2; Part B) was transferred to a large aluminum pan in a hood to cool to room temperature. A convenient method to reduce the product to a fine powder for resulting coating operations was to introduce a controlled amount of liquid nitrogen to a batch of product and crush and sieve to the desired particle size.

Example 4

Preparation of Three-Bead Three-Component Resin Coated Proppant (RCP) Part B1, Part B2

MCE-B1-B2 is 3-component 3-bead formulation based on a 50(A):25(B-1):25(B-2) mixture of three types of coated Carboprop HSP proppant beads: Part A (DER 663U) (50%) with 25% Part B-1 (Epikure P-202) and 25% Part B-2 (Epikure P-100).

Representative epoxy-reactive functional resin binder component coated proppant (Part B1) was prepared using the following procedure. There are a number of suitable epoxy-reactive binder components that can be utilized. A preferred embodiment is to use the MCE-B1, and MCE-B2 binders as described previously. Into a pair of suitable containers (e.g. 550 mL Thinky® mixer cup (HDPE)) were each placed: 200 parts of suitable proppant (e.g. CarboLite® 16/20 (Carbo Inc), Carboprop HSP® 20/40 (Carbo Inc), Ottawa sand etc) and the corresponding amount of MCE-B1 (e.g. Epikure P-202)(2) or MCE-B2 (e.g. Epikure P100 to achieve the target loading. For example, to prepare a nominal 4 pph (3.85 wt %) loading 8 grams of MCE-B1 or MCE-B2 were added to 200 grams of proppant. Next, the containers were placed in a ~114° C. oven for ~60 minutes to soften, melt the mixture. Then, the pair of containers were mixed at ~1400 rpm for ~30 seconds using a Thinky® ARV-930T (twin container) centrifugal planetary mixer. Next, the containers were removed from the mixer and a metal spatula was used to scrape the material from the interior walls to the center of the mixing cup and the containers returned to the 114° C. oven for a period of time of at least 10 minutes to about 60 minutes depending on the number of containers being processed. Then, the pair of containers was returned to the Thinky® ARV-930T machine and mixed for a second and final cycle of ~30 seconds at ~1400 rpm. Finally, the containers were removed from the mixer and the resin coated proppant MCE-B1 or MCE-B2 (Part Bs) was transferred to a large aluminum pan in a hood to cool to room temperature. A convenient method to reduce the product to a fine powder for resulting coating operations was to introduce a controlled amount of liquid nitrogen to a batch of product and crush and sieve to the desired particle size.

Example 5

Preparation of Linear Gel Carrier Fluid

In order to simulate the delivery method to be used in the final application, the binder resin coated proppant particles of this invention (Example 1, 2, or 3) were dispersed separately in a high viscosity carrier fluid (e.g. hydroxyethyl cellulose (HEC), or crosslinked guar, respectively). For the linear gel (HEC) carrier either powder or polymer suspensions can be utilized. For a preferred embodiment of this invention, an HEC concentrate (40% solids suspension in mineral oil) from Drilling Specialties (www.cpchem.com) was used. First, 1000 parts water was added to a suitable container and acidified to between pH 4-5 with a 50:50 mixture of acetic acid in water (~0.15 parts) to facilitate the subsequent dispersion, and prevent clumping by too rapid hydration of the HEC. Next, an 80 pounds per thousand gallon (80 pptg=~24 mL/L $H_2O$) carrier fluid slurry was prepared by adding 24 parts by volume (pbv) of the HEC mineral oil concentrate under vigorous stirring for about one minute. Once the HEC polymer was fully hydrated the pH of the mixture was basified to pH ~9 by adding ~2.1 pbv of 0.25M potassium hydroxide (KOH) to facilitate dispersion with the vigorous stirring continued for several minutes. Then, the final pH of the slurry was adjusted back to neutral (~pH=7) through the addition of a small amount of 50:50 mixture of acetic acid in water (~0.05 parts).

Figure 19:
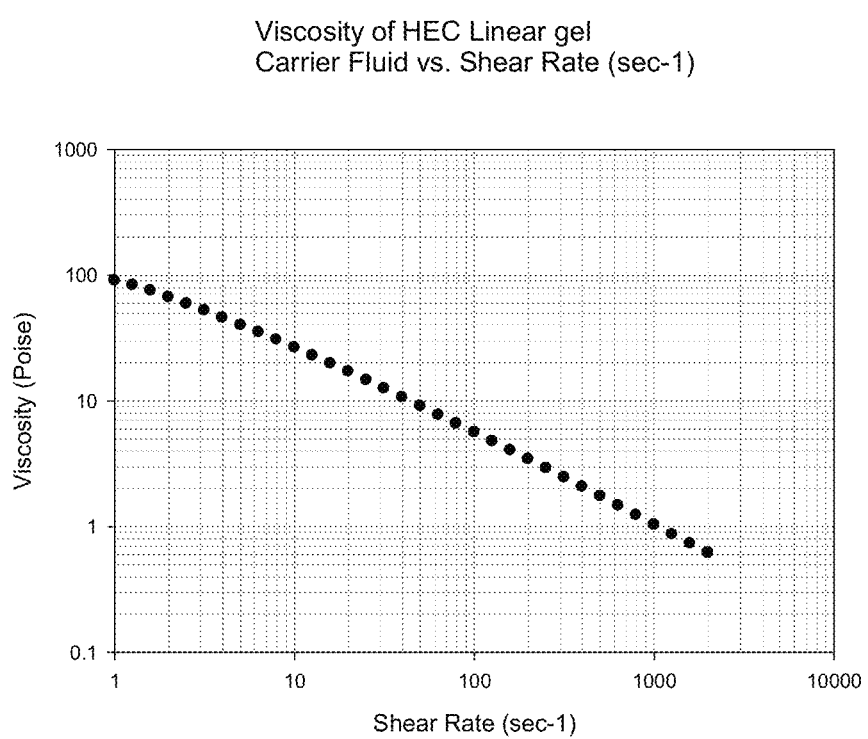
FIG. 19 Rheological Characterization of HEC Carrier Fluid

To check the quality of the HEC dispersion an aliquot was tested using a Fann 35B viscometer at ~300 rpm (~511 $sec^{-1}$ shear rate) with a target value of ~180 cps or more. In addition, a viscosity vs increasing shear rate measurement of the gel was conducted using a TA computer controlled rheometer in parallel plate mode (results shown in FIG. 19).

Example 6

Preparation of Crosslinked Guar Gel Carrier Fluid

Figure 20:
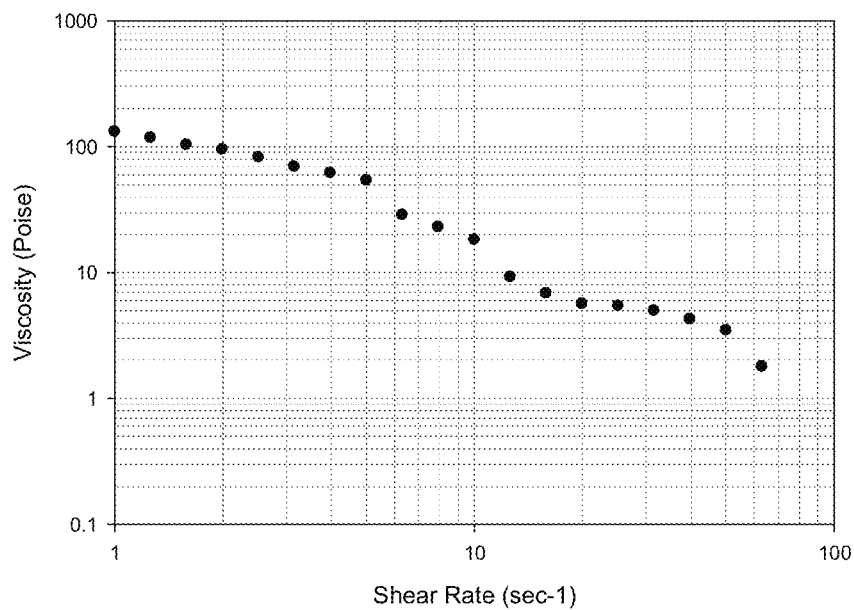
FIG. 20 Rheological Characterization of HEC Cross-linked Guar Carrier Fluid

For the crosslinked Guar gel carrier either powder or polymer suspensions can be utilized. For a preferred embodiment of this invention, a guar concentrate (80 # (pptg) Seaquest®) from Halliburton Inc. suspension in mineral oil was used. First, a ~30# (pptg) carrier fluid mixture was prepared by adding ~385 parts Seaquest® to ~615 parts tap water in a suitable container with stirring. The mixture was then mixed at ~1200 rpm for ~8 minutes to disperse the guar suspension. Next 802 parts of the guar dispersion was placed in a suitable container and the pH was adjusted to 9.5-10 while stirring in 12.0 parts Vicon NF Then, a small amount (0.2 parts Cat-OS-1) of catalyst was added with continued stirring at ~500-1000 rpm. Next the first crosslinking agents 4.81 parts CL-38 was added while mixing, being careful to minimize air-entrapment by varying the speed between 1000 and 500 rpm. Then 0.8 parts of the second faster crosslinking agent (CL-31) was added and the mixture stirred at ~850 rpm for several minutes until the maximum viscosity crosslinked gel formed, whereupon the stir speed was decreased to ~500 rpm. The pH of the slurry was again checked and confirmed to be pH ~9.5. To check the quality of the crosslinked guar dispersion, an aliquot was tested using a Fann 35B viscometer at ~300 rpm (~511 $sec^{-1}$ shear rate) with a target value of ~180 cps or more. In addition, a viscosity vs increasing shear rate measurement of the gel was conducted using a TA computer controlled rheometer in parallel plate mode (results shown in FIG. 20).

Example 7

Preparation and Loading of Proppant Slurry into Curing Cells

For a typical experimental test cell, into a stainless steel beaker, was added ~144 parts of resin coated proppant beads (1,2,3) (72 pbw of Part A and 72 pbw of Part B i.e., B1, B2, or B1/B2) and premixed by hand with a spatula for ~1 minute to help randomize the two components. Then, in a separate stainless steel beaker was placed either 75 parts of linear gel (HEC, example 4) or crosslinked guar gel carrier fluid (example 5), respectively, and overhead stirring begun at ~500 rpm. Next, the resin coated proppant was slowly added to the carrier fluid with continued stirring. After the proppant has been completely added, the proppant carrier fluid slurry was mixed an additional few minutes at 500 rpm.

The proppant carrier slurry mixture was then transferred into a set of ~1" diameter stainless steel cylindrical cure test cells (see FIG. 21) leaving ~0.5" of space available at the top. Then the remaining head space in the cell was filled with 2% KCl (brine). Next, to simulated pumping of the slurry, a ported piston was inserted, textured side down, in the top of each loaded cell and a pushed ~2.3" vertically down into the cylinder with a small press, allowing some of the fluid (~25 mL) to escape through the bottom. Then, additional brine 2% KCl was added to completely fill the top of each cell and the cell top was assembled and sealed.

For (worst-case) samples that were to be cured in the presence of the viscosified carrier fluid, the test cell was placed in an oven in the vertical position and cured under the appropriate conditions.

For samples that were to be flushed with brine according to the desired downhole FnP scenario an addition processing step was used. The assembled test cell manifold valves were connected to a pump and the carrier was flushed from the cell until ~100 mL of effluent was collected from the bottom. After the cell flushing was complete, the test cell was again topped off with 2% KCl and reassembled with the cap and sealed.

Figure 21:
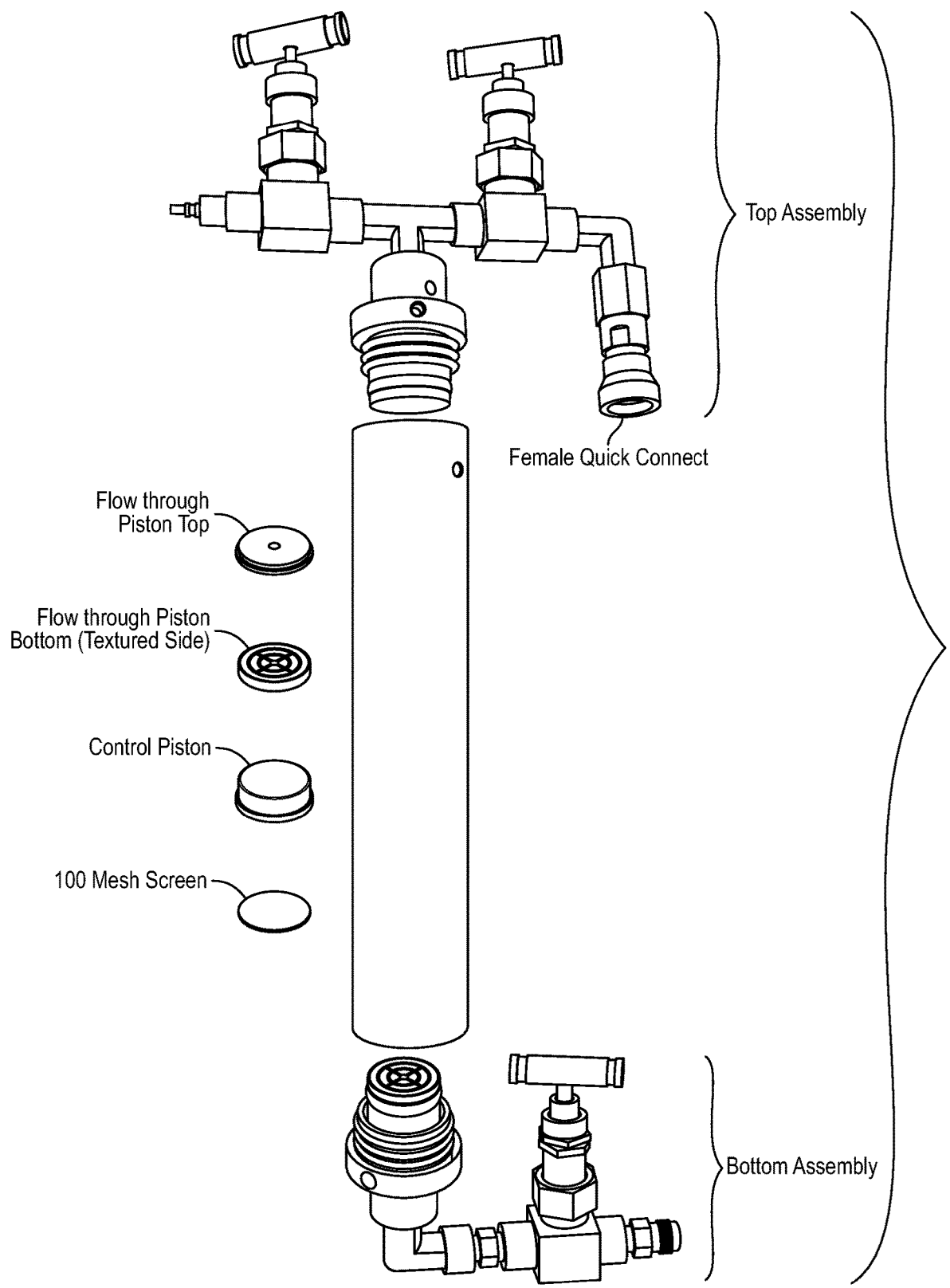
FIG. 21. Example of Binder Resin Coated Proppant Slurry Loading, Flushing and Curing and Testing Cell FIG. 22. Disassembled Flow-Through Sample Curing and Testing Cell FIG. 23. Flow through Test Results for MCE Binder System
Figure 22:
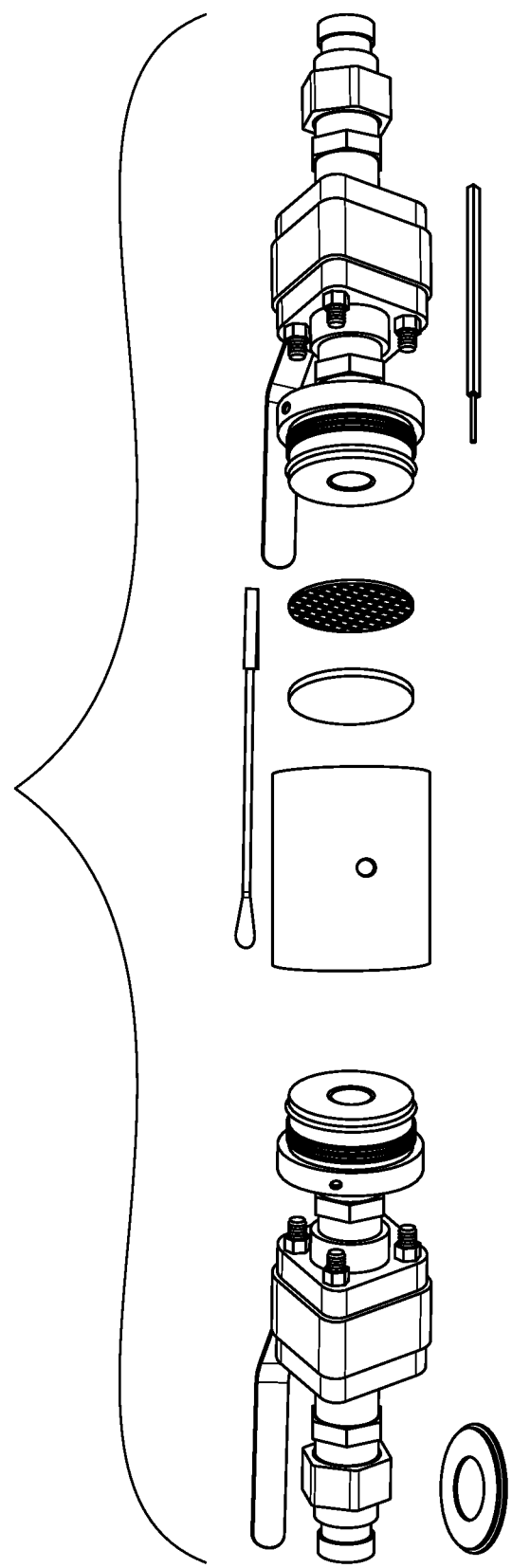

To prepare corresponding samples for hydraulic stability and permeability a flow-through test cell (FTC) as shown in FIG. 21 was loaded with the same slurry as above and cured.

Example 8

Curing of Binder Resin Coated Proppant

In a typical experiment, a set of test cells were placed in vertical holding rig and loaded into large ovens. They were cured under a matrix of cure profiles designed to represent a range of potential down-hole temperatures. These included several scenarios of the warm-up time period between the completion of proppant delivery and the return of the formation to equilibrium temperature range in the absence of any water injection flow.

Batches of proppant beads were coated with (1,2,3) epoxy (A) and epoxy-reactive (B) components for time-temperature curing and unconfined compressive strength (UCS) properties at Battelle. For example, sample cells cured for 3 days @ 160° F. and @ 200° F. We have evaluated the formulation a using the Slow Ramp to 160° F. and 200° F. over 3 days, and Fast Ramp to 160° F. and 200° F. over one day. In addition, samples were cured in both cases of flushing the gel with 2% KCl brine and with leaving the HEC or crosslinked gel in the cell. The matrix of cure test protocols is shown in Table 6 below.

TABLE 6

| Test protocol for evaluation of Battelle proppant samples | |
|---|---|
| No Flush | 2% KCl Brine Flush |
| 160° F. Slow (72 hr Ramp) | 160° F. Slow (72 hr Ramp) |
| 160° F. Fast (24 hr Ramp) | 160° F. Fast(24 hr Ramp) |
| 160° F. Constant | 160° F. Constant |

TABLE 6-continued

Test protocol for evaluation of Battelle proppant samples

| No Flush | 2% KCl Brine Flush |
|---|---|
| 200° F. Slow (72 hr Ramp) | 200° F. Slow(72 hr Ramp) |
| 200° F. Fast (24 hr Ramp) | 200° F. Fast (24 hr Ramp) |
| 200° F. Constant | 200° F. Constant |

Representative test results for unconfined compressive strength (UCS) are presented in Table 7, Table 8, and Table 9, for systems delivered in HEC, crosslinked Guar, w,w/o flushing with brine. The results of the UCS and FTC test for a wide variety of formulations with 3% to 5% loading of the binder components on the proppant beads is tabulated in the following Tables.

TABLE 7

UCS Test Results for Binder System 1 Part A, Part B1, Part B2 on separate Beads (5% loading) Proppant particle CarboProp HSP

| 5% loading | Part A; Part B1; Part B2 (three bead system) UCS (psi) for HEC flushed cells Days | | |
|---|---|---|---|
| | 1 | 2 | 3 |
| 160 F. | 88 ± 23 | 177 ± 39 | 120 ± 10 |
| 200 F. | 180 ± 70 | 131 ± 14 | 126 ± 31 |
| SR 160 | 49 ± 10 | 74 ± 10 | 53 ± 10 |

TABLE 8

UCS Test Results for System 2: Part A, Blend of Part B1/Part B2 (75:25) on separate beads (5% loading) in HEC carrier fluid Proppant particle CarboLite 16/20

| 5% loading | Part A; Part B1/B2(75:25 blend) (two bead system) UCS (psi) for HEC flushed cells Days | | |
|---|---|---|---|
| | 1 | 2 | 3 |
| 160 F. | n.d. | n.d. | n.d. |
| 200 F. | 225 | 187 | 163 |
| SR 160 | 36 | 60 | 79 |

TABLE 9

UCS Test Results for System 2: Part A, Part B1/Part B2 Blend (75:25) on separate beads (5% loading) in Crosslinked Guar carrier fluid (brine flushed) Proppant particle CarboLite 16/20

| 5% UCS | Part A; Part B1/B2(75:25 blend) (two bead system) UCS (psi) for x-linked Guar flushed cells Days | | |
|---|---|---|---|
| | 1 | 2 | 3 |
| 160 F. | 11 | 30 | 15 |
| 200 F. | 13 | 14 | 79 |
| SR 160 | 0 | 0 | 34 |
| FR 160 | 0 | 9 | 28 |

TABLE 9

UCS Test Results for System 2: Part A, Part B1/Part B2 Blend (75:25) on separate beads (5% loading) in Crosslinked Guar carrier fluid (not flushed) Proppant particle CarboLite 16/20

| 5% UCS | Part A; Part B1/B2(75:25 blend) (two bead system) UCS (psi) for x-linked Guar non- flushed cells Days | | |
|---|---|---|---|
| | 1 | 2 | 3 |
| 160 F. | 0 | 26 | 22 |
| 200 F. | 38 | 26 | 23 |
| SR 160 | n.d. | n.d. | n.d |
| FR 160 | 21 | 11 | 11 |

Proppant Particle CarboLite 16/20

Figure 23:
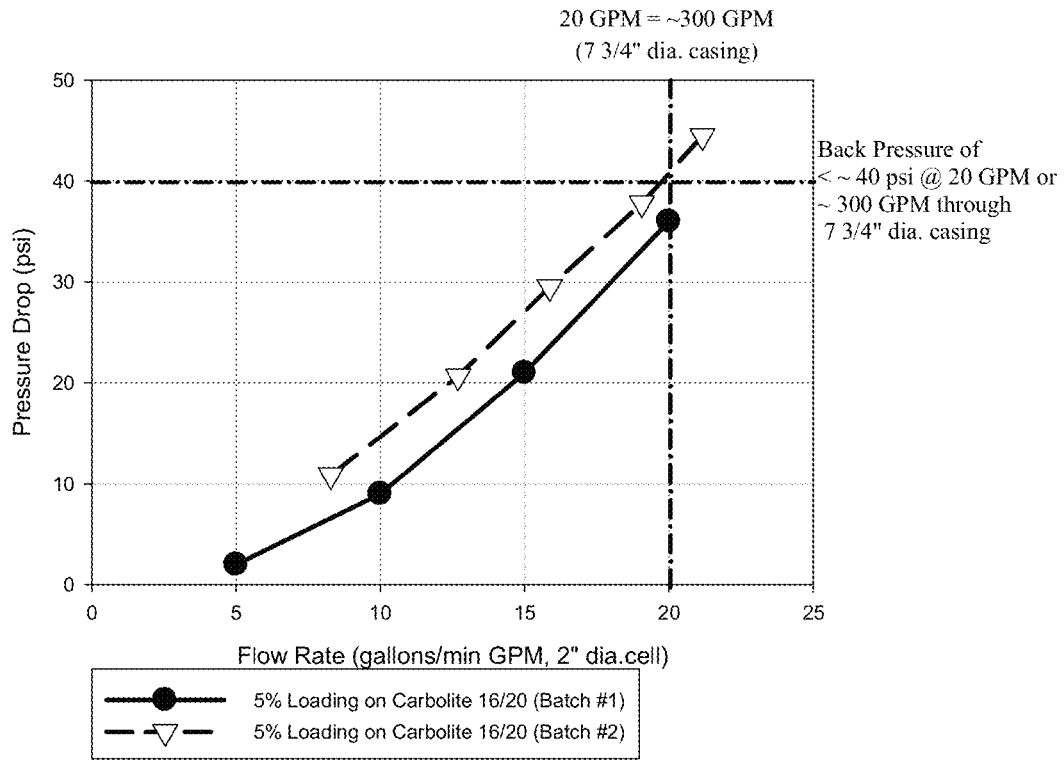

Hydraulic stability and permeability (FTC) test results at the equivalent of 300 gallon per minute through a 8-inch casing are shown in FIG. 23.

Example 11

Utility of Resin Binder Coated Proppants in Other Soil Consolidation Applications There is also a need to improve the stability of soil formations, such as when subsidence, sinkholes or other geologic formation problems exist. The products of this invention may be successfully used as substitutes for concrete piers and pillars currently employed in this application. The present invention may provide with both lighter weight and the ability to control the hydraulic stability to be more or less porous base on control of the binder thickness and the range of particle size blends used in particular support elements. The reaction temperature regime and cure kinetics may be controlled by catalysts and desired latency period.

While various embodiments of the present invention have been described above, it should be understood that they have been presented by way of example only, and are not intended to limit the invention.

What is claimed:

1. A method of extracting hydrocarbons from an underground formation, comprising:
    forming at least one production well;
    optionally, forming at least one water injection well in proximity to the at least one production well;
    injecting a slurry through a wellbore and into the underground formation, wherein the slurry comprises a first resin coated proppant, a second resin coated proppant, and a carrier fluid, wherein a reactive component in the resin coating on the first coated proppant consists essentially of one or more epoxy moieties and wherein a reactive component in the resin coating on the second coated proppant consists essentially of one or more amine, amide, imidazole, or combinations thereof, wherein the proppants in the slurry react via an epoxy reaction to form a cross-linked, porous and immobilized proppant network in the area around the wellbore, and wherein the ratio of the first coated proppant particles to the second coated proppant particles is from 10:1 to 1:10 by number of particles of each;
    injecting water into the underground formation; and
    withdrawing hydrocarbons through the production well.
2. The method of claim 1 comprising forming at least one water injection well in proximity to the at least one production well; and passing water through the wellbore of the water injection well.

3. The method of claim 1 wherein water is passed through the wellbore of the production well prior to the step of withdrawing hydrocarbons through the production well.

4. The method of claim 1 wherein the slurry comprises HEC gel or crosslinked Guar gel.

5. The method of claim 1 wherein the slurry comprises a ratio of the first coated proppant particles to the second coated proppant particles wherein the ratio of the first coated proppant particles to the second coated proppant particles is in the range 2:1 to 1:2 by number of particles of each.

6. The method of claim 1 wherein the slurry comprises a ratio of the first coated proppant particles to the second coated proppant particles wherein the ratio of the first coated proppant particles to the second coated proppant particles is within 10% of a 1:1 ratio by number of particles of each.

7. The method of claim 1 wherein the proppants are selected from the group consisting of silica proppants, ceramic proppants, metallic proppants, synthetic organic proppants, sintered bauxite, and combinations thereof.

8. The method of claim 1 wherein the proppants comprise naturally occurring particulate materials selected from the group consisting of pebbles, gravel, sand and combinations thereof.

9. The method of claim 1 wherein the proppants comprise natural products selected from the group consisting of nut shells, fruit shells and combinations thereof.

10. The method of claim 1 wherein the one or more epoxy moieties are provided by the one or more epoxy moieties selected from the group consisting of: High molecular weight (MW) Solid Epoxy Resins (SERs) based on DGEBA; Multifunctional Epoxy Resins: Epoxy Phenolic Novolacs (EPN) and Epoxy Cresol Novolacs (ECN); Glycidyl Ethers of Hydrocarbon Epoxy Novolacs; Bisphenol A Epoxy Novolacs; Epoxy Resins based on Heterocyclic Glycidyl Imides and Amides, and combinations thereof.

11. The method of claim 1 wherein the second coated proppant consists essentially of an amine or amide.

* * * * *